(12) United States Patent
Frank et al.

(10) Patent No.: US 11,169,028 B2
(45) Date of Patent: Nov. 9, 2021

(54) UNMANNED AERIAL SYSTEM BASED THERMAL IMAGING AND AGGREGATION SYSTEMS AND METHODS

(71) Applicant: FLIR Systems, Inc., Wilsonville, OR (US)

(72) Inventors: Jeffrey D. Frank, Santa Barbara, CA (US); Thomas J. Scanlon, Nashua, NH (US); Theodore R. Hoelter, Santa Barbara, CA (US); Nicholas Hogasten, Santa Barbara, CA (US); Austin A. Richards, Santa Barbara, CA (US); Michael Kent, Goleta, CA (US); Julie R. Moreira, Goleta, CA (US); Pierre M. Boulanger, Goleta, CA (US); Raymond Valdes, Walnut Park, CA (US); Jonathan Li, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 155 days.

(21) Appl. No.: 15/997,302

(22) Filed: Jun. 4, 2018

(65) Prior Publication Data

US 2018/0283953 A1 Oct. 4, 2018

Related U.S. Application Data

(63) Continuation of application No. PCT/US2016/066037, filed on Dec. 9, 2016.
(Continued)

(51) Int. Cl.
*G01J 5/00* (2006.01)
*H02S 50/15* (2014.01)
(Continued)

(52) U.S. Cl.
CPC ............. *G01J 5/00* (2013.01); *B64C 39/024* (2013.01); *G01J 5/007* (2013.01); *G01J 5/0265* (2013.01);
(Continued)

(58) Field of Classification Search
CPC .......... G01J 5/00; B64C 39/024; H02S 50/15
(Continued)

(56) References Cited

U.S. PATENT DOCUMENTS 3,964,694 A 6/1976 Metzger et al.
7,837,371 B2 11/2010 Grötsch et al.
(Continued)

FOREIGN PATENT DOCUMENTS

CN 102597722 7/2012
CN 104764533 7/2015
(Continued)

OTHER PUBLICATIONS

Khodaei et al., "3D Surface Generation from Aerial Thermal Imagery," ISPRS—The International Archives of the Photogrammetry, Remote Sensing and Spatial Information Sciences, Nov. 25, 2015, pp. 401-405, vol. XL-1-W5 (Year: 2015).*
(Continued)

*Primary Examiner* — Jeffery A Williams
(74) *Attorney, Agent, or Firm* — Haynes and Boone, LLP

(57) ABSTRACT

Flight based infrared imaging systems and related techniques, and in particular UAS based thermal imaging systems, are provided to improve the monitoring capabilities of such systems over conventional infrared monitoring systems. An infrared imaging system is configured to compensate for various environmental effects (e.g., position and/or strength of the sun, atmospheric effects) to provide high resolution and accuracy radiometric measurements of targets imaged by the infrared imaging system. An infrared imaging
(Continued)

system is alternatively configured to monitor and determine environmental conditions, modify data received from infrared imaging systems and other systems, modify flight paths and other commands, and/or create a representation of the environment.

20 Claims, 15 Drawing Sheets

Related U.S. Application Data

(60) Provisional application No. 62/265,413, filed on Dec. 9, 2015, provisional application No. 62/265,415, filed on Dec. 9, 2015, provisional application No. 62/265,416, filed on Dec. 9, 2015, provisional application No. 62/374,709, filed on Aug. 12, 2016, provisional application No. 62/374,716, filed on Aug. 12, 2016, provisional application No. 62/402,992, filed on Sep. 30, 2016.

(51) Int. Cl.

| | | |
|---|---|---|
| *B64C 39/02* | (2006.01) | |
| *G01J 5/02* | (2006.01) | |
| *H02S 50/00* | (2014.01) | |
| *G01J 5/06* | (2006.01) | |
| *H04N 5/235* | (2006.01) | |
| *H04N 5/243* | (2006.01) | |
| *H04N 5/33* | (2006.01) | |
| *G03B 15/00* | (2021.01) | |
| *G06K 9/00* | (2006.01) | |
| *G08G 5/00* | (2006.01) | |
| *H04N 7/18* | (2006.01) | |
| *H02J 4/00* | (2006.01) | |
| *H04W 84/18* | (2009.01) | |

(52) U.S. Cl.
CPC ............. *G01J 5/06* (2013.01); *G01J 5/061* (2013.01); *G03B 15/006* (2013.01); *G06K 9/0063* (2013.01); *G08G 5/0091* (2013.01); *H02S 50/00* (2013.01); *H02S 50/15* (2014.12); *H04N 5/2351* (2013.01); *H04N 5/243* (2013.01); *H04N 5/33* (2013.01); *H04N 7/185* (2013.01); *B64C 2201/123* (2013.01); *B64C 2201/127* (2013.01); *B64C 2201/141* (2013.01); *B64C 2201/146* (2013.01); *G01J 2005/0048* (2013.01); *G01J 2005/0055* (2013.01); *G01J 2005/0077* (2013.01); *G01J 2005/068* (2013.01); *H02J 4/00* (2013.01); *H04W 84/18* (2013.01)

(58) Field of Classification Search
USPC ........................................................ 348/144
See application file for complete search history.

(56) References Cited

U.S. PATENT DOCUMENTS

| | | | |
|---|---|---|---|
| 8,373,758 B2 | 2/2013 | Guha et al. | |
| 8,718,838 B2 | 5/2014 | Kokkeby et al. | |
| 8,797,550 B2 | 8/2014 | Hays et al. | |
| 9,151,858 B2 | 10/2015 | Hovstein | |
| 2005/0117367 A1 | 6/2005 | Chikugawa | |
| 2006/0081777 A1 | 4/2006 | Bevan et al. | |
| 2006/0086912 A1 | 4/2006 | Weir et al. | |
| 2009/0197584 A1* | 8/2009 | Snow ............... | H04M 1/72577 |
| | | | 455/418 |
| 2009/0321636 A1 | 12/2009 | Ragucci et al. | |
| 2011/0073707 A1 | 3/2011 | Bossert et al. | |
| 2012/0019622 A1* | 1/2012 | Rousselle ............... | G06F 17/00 |
| | | | 348/46 |
| 2012/0120069 A1 | 5/2012 | Kodaira et al. | |
| 2012/0191350 A1 | 7/2012 | Prata et al. | |
| 2012/0268912 A1 | 10/2012 | Minami et al. | |
| 2012/0287598 A1 | 11/2012 | Tadano | |
| 2012/0287599 A1 | 11/2012 | Nakamura | |
| 2012/0320203 A1* | 12/2012 | Liu ....................... | G06T 3/4038 |
| | | | 348/144 |
| 2014/0236390 A1 | 8/2014 | Mohamadi | |
| 2014/0316616 A1* | 10/2014 | Kugelmass ........... | G06T 11/206 |
| | | | 701/8 |
| 2014/0320607 A1 | 10/2014 | Hamann et al. | |
| 2015/0304612 A1 | 10/2015 | Richards et al. | |
| 2017/0003684 A1 | 1/2017 | Knudsen | |
| 2017/0076612 A1 | 3/2017 | Takahashi et al. | |
| 2019/0026580 A1 | 1/2019 | Shemesh | |

FOREIGN PATENT DOCUMENTS

| | | |
|---|---|---|
| DE | 112010004353 | 12/2012 |
| WO | WO 2015/088618 | 6/2015 |

OTHER PUBLICATIONS

Aghaei et al., "Unmanned Aerial Vehicles in Photovoltaic Systems Monitoring Applications," 29$^{th}$ European Photovoltaic Solar Energy Conference and Exhibition, Sep. 2014, pp. 2734-2739.

Berni et al., "Remote Sensing of Vegetation from UAV Platforms Using Lightweight Multispectral and Thermal Imaging Sensors," Inter-Commission WG I/V, Jan. 1, 2009, 6 Pages.

Cascella, Guy, "Inner-core characteristics of Ophelia (2005) and Noel (2007) as revealed by Aerosonde data," 28$^{th}$ Conference on Hurricanes and Tropical Meteorology, Apr. 29, 2008, [retrieved on Oct. 24, 2018], 1 Page [online]. Retrieved from the Internet: <https://ams.confex.com/ams/28Hurricanes/techprogram/paper_137864.htm>.

Cassano et al., "UAV Observations of the Wintertime Boundary Layer Over the Terra Bay Polynya, Antarctica," EGU General Assembly Conference Abstracts, 2010, 1 Page, vol. 12.

Dias et al., "Obtaining Potential Virtual Temperature Profiles, Entrainment Fluxes, and Spectra from Mini Unmanned Aerial Vehicle Data," Boundary-Layer Meteorol, Jan. 12, 2012, pp. 93-111, vol. 145, Springer.

"FLIR Vue Pro R—Radiometry Tech Note," FLIR, Jun. 6, 2016 [retrieved on Mar. 16, 2017], 3 Pages [online]. Retrieved from the Internet: <http://www.flir.com/uploadedFiles/sUAS/Products/Vue-Pro-R/SUAS-Radiometry-Technical%20Note-FINAL-060616.pdf>.

Holder et al., "Processing Turbulence Data Collected on board the Helicopter Observation Platform (HOP) with the Empirical Mode Decomposition (EMD) Method," Journal of Atmospheric and Oceanic Technology, May 2011, pp. 671-683.

Khodaei et al., "3D Surface Generation from Aerial Thermal Imagery," ISPRS—The International Archives of the Photogrammetry, Remote Sensing and Spatial Information Sciences, Nov. 25, 2015, pp. 401-405, vol. XL-1-W5.

Lega et al., "Using Advanced Aerial Platforms and Infrared Thermography to Track Environmental Contamination," Environmental Forensics, Dec. 4, 2012, pp. 332-338, vol. 13, No. 4.

Li et al., "Towards automatic power line detection for a UAV surveillance system using pulse coupled neural filter and an improved Hough transform," Machine Vision and Applications, 2009, pp. 677-686, vol. 21, No. 5, Springer-Verlag.

"Lightweight Thermal Imager can be Mounted to UAS for Aerial Inspection Tasks," UAS Vision, Jul. 16, 2013, [retrieved on Oct. 24, 2018], 2 Pages [online]. Retrieved from the Internet: <https://www.uasvision.com/2013/07/16/lightweight-thermal-imager-can-be-mounted-to-uas-for-aerial-inspection-tasks/>.

Lombardo et al., "UAVs to Inspect Solar Farms," engineering.com, May 4, 2014, [retrieved on Oct. 24, 2018], 2 Pages [online].

(56) References Cited

OTHER PUBLICATIONS

Retrieved from the Internet: <https://www.engineering.com/3DPrinting/3DPrintingArticles/ArticleID/7544/UAVs-to-Inspect-Solar-Farms.aspx>.

Lu et al., "Parallel Hough Transform-Based Straight Line Detection and Its FPGA Implementation in Embedded Vision," Sensors, Jul. 17, 2013, pp. 9223-9247, vol. 13, No. 7.

Machado, Christopher R., An Analysis of Meteorological Measurements Using a Miniature Quad-Rotor Unmanned Aerial System, Diss. Monterey, California: Naval Postgraduate School, Jun. 2015, 97 Pages.

Mayer et al., "Profiling the Arctic Stable Boundary Layer in Advent Valley, Svalbard: Measurements and Simulations," Boundary-Layer Meteorol, Mar. 20, 2012, pp. 507-526, vol. 143, Springer.

Murvay et al., "A Survey on Gas Leak Detection and Localization Techniques," Journal of Loss Prevention in the Process Industries, Nov. 1, 2012, pp. 966-973, vol. 25, No. 6.

"Practical Guide Solar Panel Thermography," Testo, Inc., [retrieved on Oct. 24, 2018], 19 Pages [online]. Retrieved from the Internet: <http://www.murcal.com/pdf%20folder/15.testo_thermography_guide.pdf>.

Reineman, Benjamin D., "The Development of Instrumentation and Methods for Measurement of Air-Sea Interaction and Coastal Processes from Manned and Unmanned Aircraft," University of California, San Diego, 2013, pp. 1-183, ProQuest.

Reineman et al., "Development and Testing of Instrumentation for UAV-Based Flux Measurements within Terrestrial and Marine Atmospheric Boundary Layers," Journal of Atmospheric and Oceanic Technology, Jul. 2013, pp. 1295-1319, vol. 30.

Shurkin, Joel, "Surfboard-Sized Drones Crossing Pacific to Monitor Sea Surface," Inside Science, Jan. 17, 2012, [retrieved on Oct. 24, 2018], 6 Pages [online]. Retrieved from the Internet: <https://www.insidescience.org/news/surfboard-sized-drones-crossing-pacific-monitor-sea-surface>.

Thomas et al., "Measurement of Turbulent Water Vapor Fluxes Using a Lightweight Unmanned Aerial Vehicle System," Atmospheric Measurement Techniques, Jan. 27, 2012, pp. 243-257, vol. 5.

Tsanakas et al., "An infrared thermographic approach as a hot-spot detection tool for photovoltaic modules using image histogram and line profile analysis," The International Journal of Condition Monitoring, Mar. 1, 2012, pp. 22-30, vol. 2, Issue 1.

Yan et al., "Automatic Extraction of Power Lines from Aerial Images," IEEE Geoscience and Remote Sensing Letters, Jul. 2007, pp. 387-391, vol. 4, No. 3.

Office Action, dated Oct. 2, 2020, from European patent application No. 16865280.8, pp. 1-6.

Office Action, dated Oct. 5, 2020, from European patent application No. 16880187.6, pp. 1-6.

Lebourgeois et al., "Atmospheric Corrections of Low Altitude Thermal Infrared Airborne Images Acquired Over a Tropical Cropped Area," IEEE International Geoscience & Remote Sensing Symposium, Boston, (2008), pp. 1-4, URL: https://agritrop.cirad.fr/545904/1/document_545904.pdf, 2008.

\* cited by examiner

UNMANNED AERIAL SYSTEM BASED THERMAL IMAGING AND AGGREGATION SYSTEMS AND METHODS

CROSS-REFERENCE TO RELATED APPLICATIONS

This application is a continuation of International Patent Application No. PCT/US2016/066037 filed Dec. 9, 2016 and entitled "UNMANNED AERIAL SYSTEM BASED THERMAL IMAGING AND AGGREGATION SYSTEMS AND METHODS," which is incorporated herein by reference in its entirety International Patent Application No. PCT/US2016/066037 filed Dec. 9, 2016 claims priority to and the benefit of U.S. Provisional Patent Application No. 62/265,413 filed Dec. 9, 2015 and entitled "AIRBORNE INSPECTION SYSTEMS AND METHODS," which is incorporated by reference in its entirety.

International Patent Application No. PCT/US2016/066037 filed Dec. 9, 2016 claims priority to and the benefit of U.S. Provisional Patent Application No. 62/265,415 filed Dec. 9, 2015 and entitled "AIRBORNE RADIOMETRIC CAMERA SYSTEMS AND METHODS," which is hereby incorporated by reference in its entirety.

International Patent Application No. PCT/US2016/066037 filed Dec. 9, 2016 claims priority to and the benefit of U.S. Provisional Patent Application No. 62/265,416 filed Dec. 9, 2015 and entitled "POSITION ENABLED INFRARED CAMERA CONTROL SYSTEMS AND METHODS," which is hereby incorporated by reference in its entirety.

International Patent Application No. PCT/US2016/066037 filed Dec. 9, 2016 claims priority to and the benefit of U.S. Provisional Patent Application No. 62/374,709 filed Aug. 12, 2016 and entitled "UNMANNED AERIAL SYSTEM BASED THERMAL IMAGING SYSTEMS AND METHODS," which is hereby incorporated by reference in its entirety.

International Patent Application No. PCT/US2016/066037 filed Dec. 9, 2016 claims priority to and the benefit of U.S. Provisional Patent Application No. 62/374,716 filed Aug. 12, 2016 and entitled "UNMANNED AERIAL SYSTEM BASED THERMAL IMAGING AND AGGREGATION SYSTEMS AND METHODS," which is hereby incorporated by reference in its entirety.

International Patent Application No. PCT/US2016/066037 filed Dec. 9, 2016 claims priority to and the benefit of U.S. Provisional Patent Application No. 62/402,992 filed Sep. 30, 2016 and entitled "UNMANNED AERIAL SYSTEM BASED THERMAL IMAGING SYSTEMS AND METHODS," which is hereby incorporated by reference in its entirety.

TECHNICAL FIELD

The present invention relates generally to infrared imaging and, more particularly, to thermal imaging from unmanned aerial systems.

BACKGROUND

As the size and weight of infrared cameras has decreased over time, their use has expanded from primarily ground based monitoring to hand held monitoring and, in recent systems, monitoring from the air through use of unmanned aerial systems (UASs). As the use of flight based infrared monitoring systems increases, there is a concomitant need to increase the reliability and accuracy of such systems while adhering to regulatory limitations on their use.

SUMMARY

Flight based infrared imaging systems and related techniques, and in particular UAS based thermal imaging systems, are provided to improve the monitoring capabilities of such systems over conventional infrared monitoring systems. One or more embodiments of the described infrared imaging systems may advantageously include a flight platform, an infrared imager coupled to the flight platform and configured to capture infrared images of a scene in view of the flight platform and output infrared data associated with the infrared images and/or the scene, a flight state sensor coupled to the flight platform and configured to measure state data corresponding to a physical state of the flight platform and/or the infrared imager, a communications module, and a controller configured to receive the infrared data from the infrared imager and the state data from the flight state sensor, wherein the infrared data is configured to measure an aspect of at least a portion of the scene, and wherein the state data corresponds to the infrared data of the aspect of the scene, and communicate the infrared data and the state data to an aggregation server via the communications module.

In certain other embodiments, a system may be disclosed. The system may include an aggregation server comprising a communications module configured to receive infrared data from one or more infrared imagers coupled to one or more flight platforms, a memory configured to store received infrared data, and a processor configured to receive the infrared data from the one or more infrared imagers coupled to the one or more flight platforms, receive state data from a flight state sensor coupled to the one or more flight platforms, construct a point model based, at least in part, on the infrared data, and render the point model for display to a user.

In certain additional embodiments, a method may be disclosed. The method may include receiving infrared data from one or more infrared imagers coupled to one or more flight platforms, receiving state data from one or more state sensors coupled to one or more flight platforms, determining one or more weights for at least portions of infrared data received from the one or more infrared imagers, constructing a point model based, at least in part, on the infrared data and the one or more weights, and rendering the point model for display to a user.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Flight based infrared imaging systems and related techniques, and in particular UAS based thermal imaging systems, are provided to improve the monitoring capabilities of such systems over conventional infrared monitoring systems. In some embodiments, an infrared imaging system may be configured to compensate for various environmental effects (e.g., position and/or strength of the sun, atmospheric effects) to provide high resolution and accuracy radiometric measurements of targets imaged by the infrared imaging system, as described herein. In other embodiments, an infrared imaging system may be configured to calculate and report radiometry for every pixel of a thermal image, as described herein. In addition, the data from the infrared imaging system may be used to create a panoramic or three-dimensional (3D) thermal representation, as described herein. In other embodiments, an infrared imaging system may be configured to monitor regulatory limitations on operation of the infrared imaging system and adjust and/or disable operation of the infrared imaging systems accordingly, as described herein.

Figure 1A:
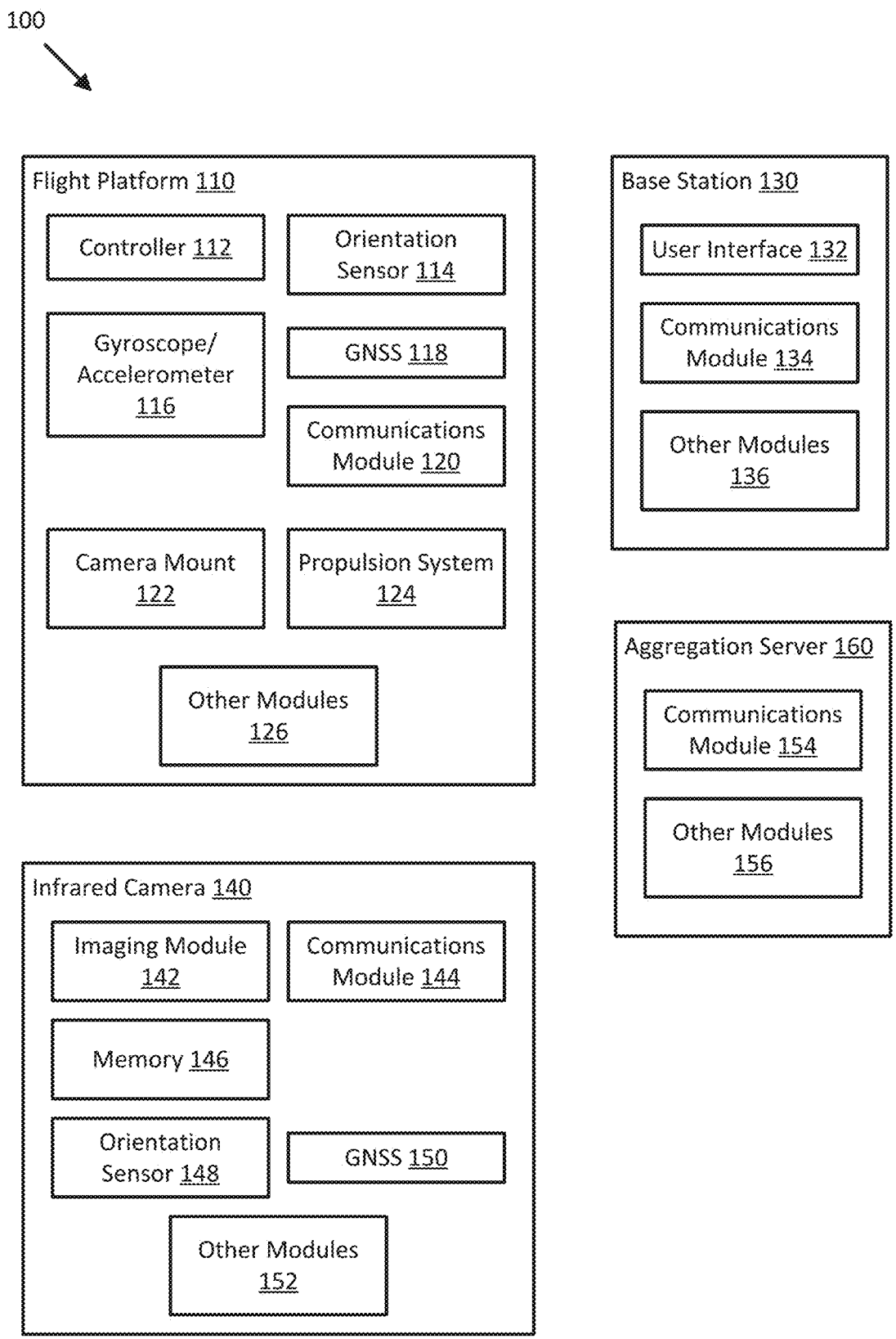
FIG. 1A illustrates a block diagram of infrared imaging system in accordance with an embodiment of the disclosure.

Reference may be made to thermal, infrared, radiant, radiance, irradiance, and/or other images and bands. For the purposes of this disclosure, such reference may be used to, generally, refer to temperature based (e.g., infrared wavelength) imaging FIG. 1A illustrates a block diagram of infrared imaging system in accordance with an embodiment of the disclosure. In some embodiments, system 100, or a portion thereof, may be configured to fly over a target and image the target using infrared camera 140. Resulting imagery may be processed (e.g., by infrared camera 140, flight platform 110, and/or base station 130) and displayed to a user through use of user interface 132 (e.g., one or more displays such as a multifunction display (MFD), a portable electronic device such as a tablet, laptop, or smart phone, or other appropriate interface) and/or stored in memory for later viewing and/or analysis. In some embodiments, system 100 may be configured to use such imagery to control operation of flight platform 110 and/or infrared camera 140, as described herein, such as controlling camera mount 122 to aim infrared camera 122 towards a particular direction, or controlling propulsion system 124 to move flight platform to a desired position relative to a target.

In the embodiment shown in FIG. 1A, infrared imaging system 100 includes flight platform 110, base station 130, and at least one infrared camera 140. Flight platform 110 may be configured to fly and position and/or aim infrared camera 140 (e.g., relative to a designated or detected target) and may include one or more of a controller 112, an orientation sensor 114, a gyroscope/accelerometer 116, a global navigation satellite system (GNSS) 118, a communications module 120, a camera mount 122, a propulsion system 124, and other modules 126. Operation of flight platform 110 may be substantially autonomous and/or partially or completely controlled by base station 130, which may include one or more of a user interface 132, a communications module 134, and other modules 136. Infrared camera 140 may be physically coupled to flight platform 110 and be configured to capture infrared images of a target position, area, and/or object(s) as selected and/or framed by operation of flight platform 110 and/or base station 130. In some embodiments, one or more of the elements of system 100 may be implemented in a combined housing or structure that can be coupled to or within flight platform 110 and/or held or carried by a user of system 100. Data from controller 112, orientation sensor 114 and/or 148, GNSS 118 and/or 150, communications module 120, 134 and/or 144, other modules 126, 136, and/or 152, imaging module 142, and/or other components may be communicated to aggregation server 160. Additionally, aggregation server 160 may also communicate data to the flight platform 110, the base station 130, and/or the infrared camera 140. Aggregation server 160 may, for example, one or more processors, memories, and/or communications devices/modules connected to one or more of base station 130, infrared camera 140, and/or flight platform 110. Aggregation server 160 may, in certain embodiments, be an aggregation server 160 present within a general vicinity of base station 130, infrared camera 140, and/or flight platform 110 and/or may be remote from base station 130, infrared camera 140, and/or flight platform 110.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations flight platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of flight platform 110, for example, or distributed as multiple logic devices within flight platform 110, base station 130, infrared camera 140, and/or aggregation server 160.

Orientation sensor 114 may be implemented as one or more of a compass, float, accelerometer, and/or other device capable of measuring an orientation of flight platform 110 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of flight platform 110 and providing such measurements as sensor signals that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of flight platform 110 (e.g., or an element of flight platform 110) based on wireless signals received from space-born and/or terrestrial sources (e.g., eLoran, and/or other at least partially terrestrial systems), for example, and capable of providing such measurements as sensor signals that may be communicated to various devices of system 100. In some embodiments, GNSS 118 may include an altimeter, for example, or may be used to provide an absolute altitude. In certain embodiments, GNSS 118 and/or other devices that may determine a location and/or global position of one or more components of system 100 such as infrared camera 140, flight platform 110, and/or other components may be referred to as a "location sensing device."

Communications module 120 may be implemented as any wired and/or wireless communications module configured to transmit and receive analog and/or digital signals between elements of system 100. For example, communications module 120 may be configured to receive flight control signals from base station 130 and provide them to controller 112 and/or propulsion system 124. In other embodiments, communications module 120 may be configured to receive infrared images (e.g., still images or video images) from infrared camera 140 and relay the infrared images to controller 112 and/or base station 130. In some embodiments, communications module 120 may be configured to support spread spectrum transmissions, for example, and/or multiple simultaneous communications channels between elements of system 100.

In some embodiments, camera mount 122 may be implemented as an actuated gimbal mount, for example, that may be controlled by controller 112 to stabilize infrared camera 140 relative to a target or to aim infrared camera 140 according to a desired direction and/or relative position. As such, camera mount 122 may be configured to provide a relative orientation of infrared camera 140 (e.g., relative to an orientation of flight platform 110) to controller 112 and/or communications module 120. In other embodiments, camera mount 122 may be implemented as a fixed mount. In various embodiments, camera mount 122 may be configured to provide power, support wired communications, provide a shutter, and/or otherwise facilitate flight operation of infrared camera 140. In further embodiments, camera mount 122 may be configured to couple to a laser pointer, range finder, and/or other device, for example, to support, stabilize, power, and/or aim multiple devices (e.g., infrared camera 140 and one or more other devices) substantially simultaneously.

Propulsion system 124 may be implemented as one or more propellers, turbines, or other thrust-based propulsion systems, and/or other types of propulsion systems that can be used to provide motive force and/or lift to flight platform 110 and/or to steer flight platform 110. In some embodiments, propulsion system 124 may include multiple propellers (e.g., a tri, quad, hex, oct, or other type "copter") that can be controlled (e.g., by controller 112) to provide lift and motion for flight platform 110 and to provide an orientation for flight platform 110. In other embodiments, propulsion system 110 may be configured primarily to provide thrust while other structures of flight platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices used to provide additional environmental information of flight platform 110, for example. In some embodiments, other modules 126 may include a humidity sensor, a wind and/or water temperature sensor, a barometer, an altimeter, a radar system, a visible spectrum camera, an additional infrared camera (with an additional mount), an irradiance detector, an ozone sensor, a carbon monoxide and/or dioxide sensor, a nephelometer, a high dynamic range (HDR) imaging device, and/or other environmental sensors providing measurements and/or other sensor signals that can be displayed to a user and/or used by other devices of system 100 (e.g., controller 112) to provide operational control of flight platform 110 and/or system 100 or to process infrared imagery to compensate for environmental conditions, such as an water content in the atmosphere between infrared camera 140 and a target, for example. In some embodiments, other modules 126 may include one or more actuated and/or articulated devices (e.g., multi-spectrum active illuminators, visible and/or IR cameras, radars, sonars, and/or other actuated devices) coupled to flight platform 110, where each actuated device includes one or more actuators adapted to adjust an orientation of the device, relative to flight platform 110, in response to one or more control signals (e.g., provided by controller 112).

In certain embodiments, other modules 126 may include, for example, detect a state condition of the flight platform 110. Such other modules 126 may include, for example, state sensors such as one or more altitude sensor, heading sensor, speed sensor, acceleration sensor, velocity sensor, global positioning coordinate receiver, compass, time of day sensor, gyros, calendar, accelerometer, and/or other state condition sensors. Such sensors may output data to controller 112 and controller 112 may determine a state of the flight platform 110. As such, controller 112 may determine, for example, the altitude, heading (e.g., direction of travel), velocity, acceleration, flight state (e.g., controlled flight or out of control), a position of the flight platform 110, a time of day, time of flight, and/or other such state of flight.

In certain such embodiments, aggregation server 160 may, for example, determine a flight state of flight platform 110 and may, in certain instances, provide instructions to flight platform 110 responsive to the determined flight state. As such, aggregation server 160 may, for example, determine that the flight speed of flight platform 110 may not be sufficient to fully image an area within a planned amount of time and thus provide instructions to increase the flight speed of flight platform 110. In another example, aggregation server 160 may determine, for example, that flight platform 110 is in a prohibited area or is about to enter a prohibited area and thus provide instructions to flight platform 110 to avoid the prohibited area. Also, aggregation server 160 may determine that a point model may require additional information from a certain area, determine the flight platform closest to the area, and then provide instructions to that flight platform to acquire information from the area.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of flight platform 110 and/or other elements of system 100. For example, user interface 132 may be adapted to display a time series of positions, headings, and/or orientations of flight platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause flight platform 110 to move according to the target heading, route, and/or orientation. In other embodiments, user interface 132 may be adapted to accept user input modifying a control loop parameter of controller 112, for example.

In further embodiments, user interface 132 may be adapted to accept user input including a user-defined target attitude, orientation, and/or position for an actuated device (e.g., infrared camera 140) associated with flight platform 110, for example, and to generate control signals for adjusting an orientation and/or position of the actuated device according to the target attitude, orientation, and/or position. Such control signals may be transmitted to controller 112 (e.g., using communications modules 134 and 120), which may then control flight platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive infrared images (e.g., still images or video images) from infrared camera 140. In some embodiments, communications module 134 may be configured to support spread spectrum transmissions, for example, and/or multiple simultaneous communications channels between elements of system 100.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, a nephelometer, an ozone sensor, a carbon monoxide and/or dioxide sensor, an HDR imaging device, and/or other environmental sensors providing measurements and/or other sensor signals that can be displayed to a user and/or used by other devices of system 100 (e.g., controller 112) to provide operational control of flight platform 110 and/or system 100 or to process infrared imagery to compensate for environmental conditions, such as an water content in the atmosphere approximately at the same altitude and/or within the same area as base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

Imaging module 142 of infrared camera 140 may be implemented as a cooled and/or uncooled array of detector elements, such as quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, infrared camera 140 may be implemented with a second or additional imaging modules similar to imaging module 142, for example, that may be include detector elements configured to detect other spectrums, such as visible light, ultraviolet, and/or other spectrums or subsets of spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of infrared camera 140 may be implemented as any wired and/or wireless communications module configured to transmit and receive analog and/or digital signals between elements of system 100. For example, communications module 144 may be configured to transmit infrared images from imaging module 142 to communications module 120 or 134. In other embodiments, communications module 144 may be configured to receive control signals (e.g., control signals directing capture, focus, selective filtering, and/or other operation of infrared camera 140) from controller 112 and/or user interface 132. In some embodiments, communications module 144 may be configured to support spread spectrum transmissions, for example, and/or multiple simultaneous communications channels between elements of system 100.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100.

Memory 146 may also be implemented, at least in part, as removable memory, such as a secure digital memory card for example including an interface for such memory.

Orientation sensor 148 of infrared camera 140 may be implemented similar to orientation sensor 114 or gyroscope/accelerometer 116, and/or another device capable of measuring an orientation of infrared camera 140 and/or imaging module 142 (e.g., magnitude and direction of roll, pitch, and/or yaw, relative to one or more reference orientations such as gravity and/or Magnetic North) and providing such measurements as sensor signals that may be communicated to various devices of system 100. GNSS 150 of infrared camera 140 may be implemented according to any global navigation satellite system, including a GPS, GLONASS, and/or Galileo based receiver and/or other device capable of determining absolute and/or relative position of infrared camera 140 (e.g., or an element of infrared camera 140) based on wireless signals received from space-born and/or terrestrial sources, for example, and capable of providing such measurements as sensor signals that may be communicated to various devices of system 100.

Other modules 152 of infrared camera 140 may include other and/or additional sensors, actuators, communications modules/nodes, cooled or uncooled optical filters, and/or user interface devices used to provide additional environmental information associated with infrared camera 140, for example. In some embodiments, other modules 152 may include a humidity sensor, a wind and/or water temperature sensor, a barometer, a radar system, a visible spectrum camera, an infrared camera, a GNSS, a nephelometer, an ozone sensor, a carbon monoxide and/or dioxide sensor, a HDR imaging device, and/or other environmental sensors providing measurements and/or other sensor signals that can be displayed to a user and/or used by imaging module 142 or other devices of system 100 (e.g., controller 112) to provide operational control of flight platform 110 and/or system 100 or to process infrared imagery to compensate for environmental conditions, such as an water content in the atmosphere approximately at the same altitude and/or within the same area as infrared camera 140, for example.

Aggregation server 160 may be, for example, a harddrive, database, and/or one or more other storage device that may include public, governmental, and/or private data sources. Data from the aggregation server 160 may be used to improve radiometric accuracy or utility of information from infrared camera 140. For example, flight platform 110, base station 130, and/or infrared camera 140 may receive data from aggregation server 160 that may adjust camera parameters, flight routines, flight characteristics, and/or other parameters. Such data may include, for example, historical, current, and future weather data, cloud cover data, solar location data, satellite data (e.g., data that may be used to estimate emissivity such as multi-spectral information), historical, current, and/or future estimated energy consumption data of specific buildings and/or devices, and/or other such data.

In certain embodiments, aggregation server 160 may receive data from flight platform 110, infrared camera 140, and/or base station 130 and create a two and/or three-dimensional point representation (e.g., a two and/or three-dimensional model). In certain such embodiments, the aggregation server 160 may, for example, receive such data via WiFi, Bluetooth, wired internet connections, wireless internet connections, IEEE formats, 3G, 4G, 5G, and/or other communications formats.

Aggregation server 160 may receive information from one or more infrared cameras 140 coupled to one or more flight platforms 110. As such, when information from a plurality of infrared cameras 140 are received, aggregation server 160 may analyze such information and construct the point model responsive to the analysis. For example, a plurality of infrared cameras 140 may image the same object and/or area. In such a situation, aggregation server 160 may, for example, determine which of the plurality of infrared cameras 140 are more accurate, more current, of a higher resolution, and/or superior in some other parameter and thus select such information for construction of the point cloud. In certain additional embodiments, aggregation server 160 may, for example, average and/or weight information from the plurality of sources to construct the point cloud or portions thereof. As such, aggregation server 160 may determine which of the plurality of infrared cameras 140 may be more likely to output accurate information.

In addition to receiving such information, aggregation server 160 may output instructions to one or more flight platforms 110 and/or infrared cameras 140. In certain such embodiments, such information may be, for example, instructions for one or more flight platforms 110 to move to a certain area, for flight platforms 110 and/or infrared cameras 140 to image a certain area and/or object, for a number of passes that one or more flight platforms 110 may make over a specific area, for certain settings of infrared camera 140, flight platform 110, other modules, and/or other such instructions.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for flight platform 110, using one or more power leads. Such power leads may also be used to support one or more communication techniques between elements of system 100.

Figure 1B:
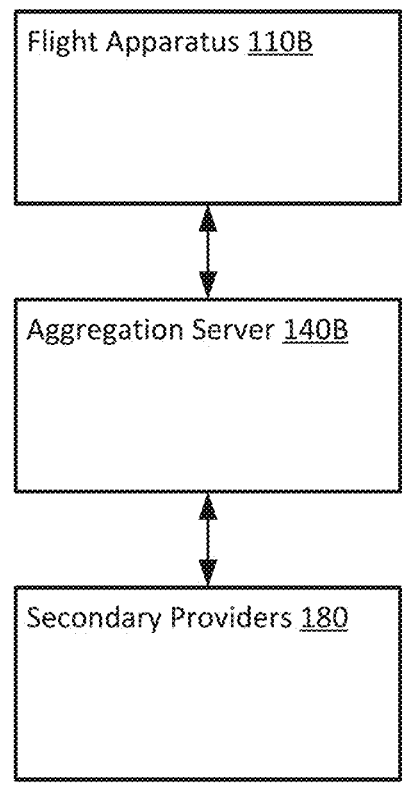
FIG. 1B illustrates a block diagram of a point model system in accordance with an embodiment of the disclosure.

FIG. 1B illustrates a block diagram of a point model system in accordance with an embodiment of the disclosure. FIG. 1B may include flight apparatus 110B, aggregation server 140B, and secondary providers 180.

Flight apparatus 110B may include, for example, one or more of flight platform 110, infrared camera 140, and/or base station 130 of FIG. 1A. Flight apparatus 110B may include some or all equipment that may be locally present as a part of or to operate flight platform 110, infrared camera 140, and/or base station 130. Additionally, flight apparatus 110B may include flight platform 110, infrared camera 140, and/or base station 130 that may provide location information associated with flight platform 110, infrared camera 140, and/or base station 130.

Aggregation server 140B may include aggregation server 160 of FIG. 1A as well as other electronic devices, processors, servers, analog computers, and other such devices that may receive data from and provide instructions to elements of flight apparatus 110B. Aggregation server 140B may receive data from flight platform 110, infrared camera 140, and/or base station 130 and, for example, create images of super resolution (e.g., high definition, 4K, or other images that may include a higher resolution; in certain such embodiments, the resolution of the images created may be higher than that of the native data), insert visual aid information within the images, perform non-uniformity correction techniques on the image, blur and/or de-blur the image, perform spot-size correction techniques, remove solar effects, correct for emissivity effects, "learn" emissivity effects to perform future adjustments, perform multi-point radiometry calculations, remove the effect of shadows from the images, create the point cloud and/or determine a required density for the point cloud, decrease and/or increase density of the point cloud according to requirements, perform Locally Adaptive Contrast Enhancement, convert and/or enhance images to high and/or low dynamic range images (e.g., upsample and/or downsample), determine a potential error for each pixel, adjust emissivity determines according to an image angle, receive data from imaging performed from multiple altitudes, create super resolution images from data from imaging performed from multiple altitudes, correct for air columns, perform temporal upsampling, and/or calculate energy outputs from portions of the environment (e.g., BTU outputs from identified energy sources).

Secondary providers 180 may include, for example, parties that may provide integration, techniques, software, and/or other services to improve quality, accuracy, resolution, and/or integration (e.g., with other images) of such images. Additionally, secondary providers 180 may include operators of flight platform 110, infrared camera 140, and/or base station 130.

Figure 2:
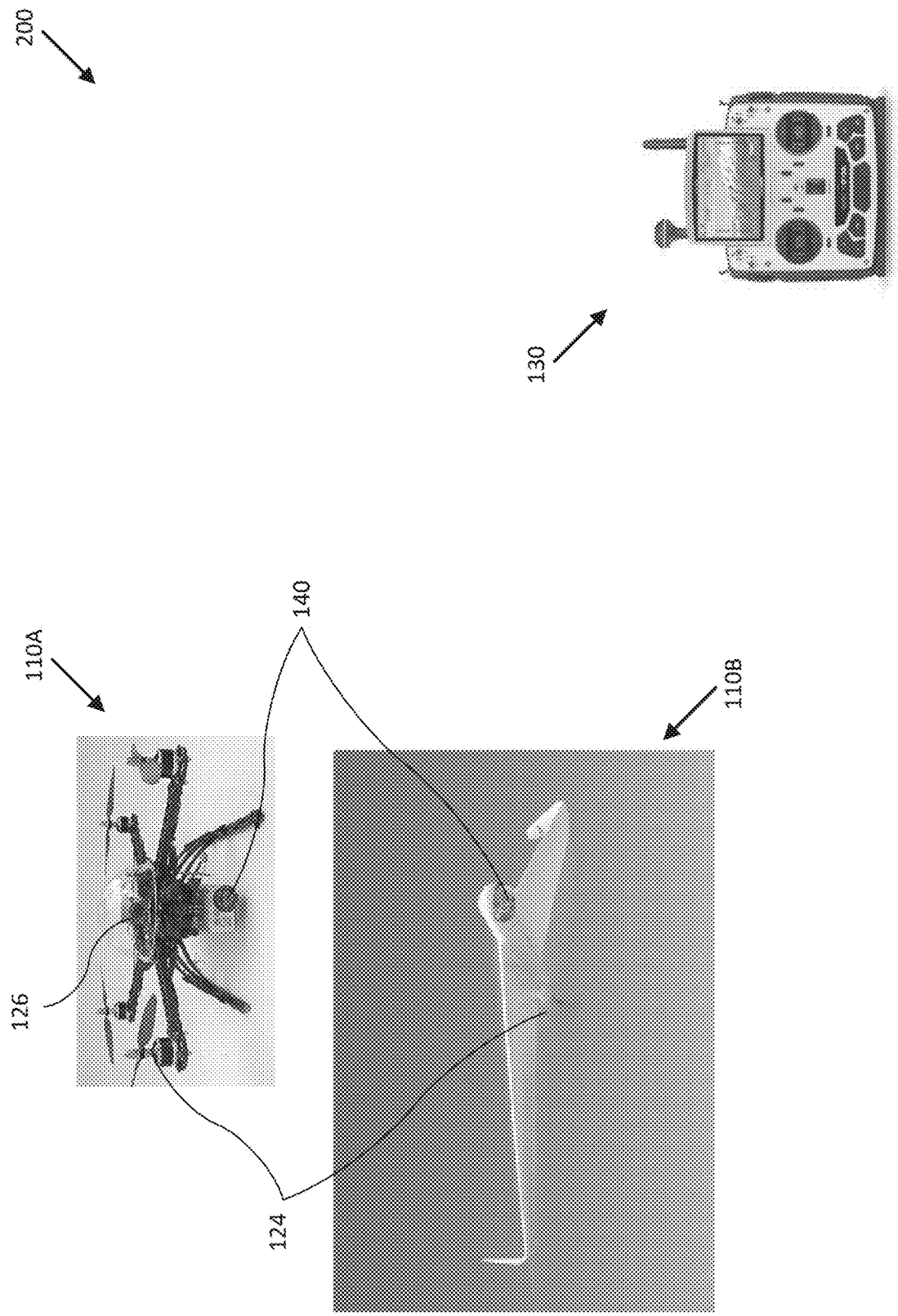
FIG. 2 illustrates a diagram of various unmanned aerial systems in accordance with an embodiment of the disclosure.

FIG. 2 illustrates a diagram of various unmanned aerial systems in accordance with an embodiment of the disclosure. In the embodiment shown in FIG. 2, infrared imaging system 100B includes base station 130, flight platform 110A with infrared camera 140 and propulsion system 124 and flight platform 110B with infrared camera 140 and propulsion system 124, where base station 130 may configured to control motion, position, and/or orientation of flight platform 110A, flight platform 110B, and/or infrared cameras 140. Also shown in FIG. 2 is an additional infrared camera (e.g., other modules 126) coupled to flight platform 110A, which may be used to detect environmental irradiance, as described more fully herein.

Figure 3:
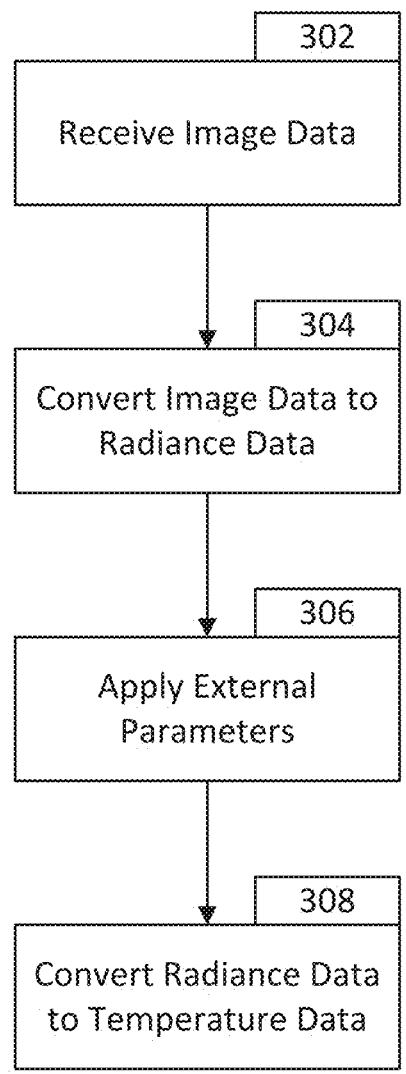
FIG. 3 illustrates a flow diagram of a technique for processing thermal images captured by an unmanned aerial system in accordance with an embodiment of the disclosure.

FIG. 3 illustrates a flow diagram of a technique for processing thermal images captured by an unmanned aerial system in accordance with an embodiment of the disclosure. The technique described in FIG. 3 may be performed by, for example, controller 112, other modules 136, 152, and/or 156, and/or another such processor (e.g., within aggregation server 160, base station 130, and/or another such electronic device) that may receive data from infrared camera 140 and other modules 126 and/or 152 of flight platform 110 and/or infrared camera 140.

In block 302, image data from infrared camera 140 and/or imaging module 142 may be received by, for example, controller 112, other modules 136, 152, and/or 156, and/or another such processor. The image data may be, for example, data associated with irradiance of an object and/or a scene. The image data may be a still image, a video, and/or a sequence of images captured by the imaging module 142.

In block 304, image data may be processed and/or converted to radiance data. In certain examples, non-uniformity correction and/or other correction techniques may be applied to the image data (before processing and/or conversion) and/or the radiance data (after processing and/or conversion). Radiance data may be representative of a kinetic surface temperature of an imaged surface. Such measured radiance may depend on, for example, emissivity of the object measured, the background temperature, atmospheric transmission effects (e.g., absorption of radiance by atmospheric objects such as dust), atmospheric radiance (e.g., radiance contributed by the atmosphere itself), distance to the object, and/or other radiance absorption and/or emitting objects within and outside of the image path.

In block 306, external parameters may be applied to the radiance data. In certain other embodiments, external parameters may alternatively or additionally be applied to the image data before conversion to the radiance data (e.g., before block 304). Other embodiments may apply the external parameters alternatively or additionally after the radiance data has been converted to temperature data (e.g., after block 308), other objects, and/or other radiance absorption and/or emitting objects.

The external parameters may include, for example, emissivity of the object measured, the background temperature, atmospheric transmission effects, atmospheric radiance, distance to the object, cloud cover, solar location, weather conditions, energy consumption of objects within and outside of the image, humidity, ambient temperature, barometric pressure, humidity, environmental particle size and counts, ozone levels, carbon monoxide and/or dioxide levels, wind strength, detected atmospheric attenuation, state conditions, speed, heading, location of flight platform 110, and/or other such parameters.

The external parameters may be utilized to enhance radiometric accuracy and improve determined radiance and/or temperature. For example, external parameters may allow for air columns to be characterized. Such air columns may, for example, be a higher temperature than the surrounding air, may affect determined radiance and/or temperatures, and/or may be determined from or characterized from sensors of other modules 126, 152, and/or 136 and/or from data from aggregation server 160. For example, sensors detecting barometric pressure, ambient temperature, humidity, thermal irradiance, wind strength, and/or other environmental conditions may be used to determine the presence of such air columns. In certain embodiments, the flight platform 110 may, for example, move from a first location to a second location, and changes in detected conditions between the first location and the second location or between the first location and an intermediate location may allow for the determination of such air columns. The presence of such air columns may then be used to modify the radiance and/or temperature of objects determined in thermal images captured by infrared camera 140.

In another example, solar location data may be used to determine a position of the sun. The flight path of the flight platform 110 may then be altered such that the infrared camera 140 is used to determine radiance and/or temperature of an object while not being directly pointed into the sun.

Additionally, in certain embodiments, the same object and/or point of the ground may be measured from multiple images and/or multiple locations. The detected temperature from such multiple images and/or multiple locations may then be processed and/or averaged to increase accuracy for the locations. Other such embodiments may measure the same location from a plurality of different altitudes. Such different measurements may help determine an environmental radiance, increase accuracy, and/or may aid in upscaling of the image.

Additionally or alternatively, multiple different locations and/or points may be determined. Such locations and/or points may be used to create a three-dimensional point cloud model of the radiance and/or temperature of the environment. In certain such embodiments, each point and/or location may be measured a plurality of times to further increase accuracy. Also, multiple imaging modules 142 and/or other imaging devices may measure such points and/or locations, substantially concurrently or at different times, to further increase accuracy. Certain such embodiments may construct the three-dimensional point cloud model with controller 112, but other such embodiments may construct the three-dimensional point cloud model with, additionally or alternatively, components of base station 130, infrared camera 140, aggregation server 160, and/or another such processor.

Flight platform 110 and/or infrared camera 140 may also include a blackbody. Such a blackbody may be temperature stabilized. Infrared camera 140 and/or imaging module 142 may occasionally and/or periodically reference the blackbody to calibrate the infrared camera 140 and/or imaging module 142 to improve radiometric accuracy. Other embodiments may, alternatively or additionally, reference, other features for temperature reference. For example, controller 112 and/or other processors may determine one or more objects with known temperatures (e.g., a human face, skin, and/or another type of grey body) in the scene imaged by infrared camera 140 and/or imaging module 142. Such objects may then be used as a temperature reference. Also, certain embodiments may include an object with a known temperature placed by an operator of the unmanned aerial system. The temperature of the object may be measured independently (e.g., by thermocouple) to determine the actual temperature. Such temperature may then be used to calibrate the infrared image and/or may be transmitted to the flight platform 110, infrared camera 140, and/or imaging module 142 and infrared camera 140 and/or imaging module 142 may image the object to calibrate the radiometric and/or thermal accuracy of the image. In certain such embodiments, the flight path of flight platform 110 may be planned to allow infrared camera 140 and/or imaging module 142 to reference the object periodically and/or regularly.

Additionally or alternatively, flight platform 110 and/or infrared camera 140 may determine an area with a high apparent temperature uniformity (e.g., during flight). The flight platform 110 and/or infrared camera 140 may determine such an area by, for example, scanning the ground. The operator may then be advised (for example, via user interface 132) of the area and instructed to place the object within the area. In certain such embodiments, the blackbody may be of a certain size (e.g., between 20-100 square inches) so that they are visible to flight platform 110 at altitude. As the apparent temperatures of blackbodies may drop off with distance, certain such blackbodies may, for example, be of sufficient size to be visible to flight platform 110 from altitudes exceeding 50 meters.

In certain embodiments, concurrent thermal and visual images may be captured. The visual images may be analyzed and solar noise from the thermal image may be eliminated by determining solar position and/or solar intensity within the visual image and correcting the thermal image accordingly.

Also, flight platform 110 may be used to survey sections of areas. Such surveys may be used to, for example, build the three-dimensional model. Data from other sources, previously conducted imaging, and/or other sources may be added to areas missed by infrared camera 140 and/or imaging module 142 during a current pass or not imaged within a certain timeframe. Such information may aid in generating the three-dimensional model. In other embodiments, currently imaged areas may be compared to historical data. Such comparisons may be used to determine trends (e.g., long term trends of temperature changes) and/or determine differences from such trends. Such trends and/or detected differences may influence flight path and/or schedule of flight platform 110.

Additionally or alternatively, flight platform 110, base station 130, may include, for example, additional modules that may provide monitoring of additional electromagnetic bands (e.g., sonar, ionizing radiation, ultraviolent, and/or other such bands). Such additional modules may, for example, detect gas leaks and provide data to render such gas leaks in a two-dimensional and/or three-dimensional representation. Also, such modules may be configured to detect shadows. Shadows may, for example, be detected according to a determined time of day, through analysis of a visual and/or thermal image captured by imaging module 142, a visual camera, and/or another such module. In certain such embodiments, detection of shadows may allow for elimination of effects of such shadows on analysis.

In certain additional embodiments, data from a nephelometer may be combined with data from infrared camera 140 and/or imaging module 142. Such data may allow certain pollution plumes to be detected and/or defined. For example, the nephelometer may detect a presence of a high concentration of particulates within an area. Such a high concentration may be determined to be a possible pollution plume. In certain such embodiments, infrared imaging data of the area may then be used to confirm whether such an area is a pollution plume. For example, if the area is determined to be of a high temperature, then the plume may be determined to be, for example, smoke from a fire.

Also, presence of toxic gas may also be determined. For example, filters and/or sensors within flight platform 110 may be used to detect presence of such toxic gas. Flight platform 110 may additionally include, for example, an anemometer to determine wind direction. Such wind direction may be used to determine flight platform 110's time change, alter a thrust amount and/or direction of flight platform 110, determine possible movement of any detected pollution and/or toxic plumes, and/or used in various other ways to determine local atmospheric conditions. In certain other embodiments, wind direction may be deduced from hover characteristics of flight platform 110 alternative or additional to that of using an anemometer.

In certain other embodiments, the wind sensor and/or other sensors may determine propeller wash and/or wind and/or heat generated by the flight platform 110. In such embodiments, the data generated by the infrared camera 140 may be adjusted to compensate for the propeller wash and/or wind and/or heat generated by the flight platform 110.

In block 308, radiance data may be converted to temperature data. As such, temperature of objects within a scene may be determined. In certain embodiments, the scene and/or objects within the scene may be rendered. In certain such embodiments, a three-dimensional point cloud may be created to allow creation of a three-dimensional representation of the environment.

Certain such embodiments may, for example, calculate a radiance and/or temperature for each pixel within the image. Additionally, such embodiments may, for example, determine a potential radiometric error for each pixel. The potential error may be determined from, for example, one or more of the image data, radiance data, temperature data, and/or external parameters and other external data received. As such, for example, the rendering may provide a graphic representation of such potential errors. Additionally, such rendering may provide graphical representation of other detected conditions.

In certain embodiments, the image data may already be or include radiance data and/or temperature data. Radiance data of other embodiments may include temperature data. In such embodiments, such data may be modified from external parameters (e.g., environmental data and/or detected or determined environmental conditions) to output adjusted and/or corrected image data, radiance data, and/or temperature data. A point model may be constructed from the adjusted and/or corrected image data, radiance data, and/or temperature data. The point model may be constructed, in certain embodiments, by one or more processors of the aggregation server 160, base station 130, infrared camera 140, and/or flight platform 110.

One or more thermal images may be rendered from image data, radiance data, and/or temperature data. In certain such embodiments, the thermal images may be upsampled and/or downsampled. As such, algorithms may be included to upsample and/or downsample such images. Certain embodiments may include commands to pilot the flight platform 110 to obtain more detailed (e.g., higher resolution) images of certain objects and/or areas of interest, or allow for additional passes over an area to obtain such information.

In accordance with embodiments described herein, infrared imaging system 100 may be configured to compensate for atmospheric interference between infrared camera 140 and a target in order to provide highly accurate and reliable radiometric thermal images of the target. Such atmospheric interference is typically not measureable when an infrared camera is less than approximately 5-10 meters from a target. However, when in flight, the distance between infrared camera 140 and target 450 (e.g., the radiance path length) can be 50-150 meters or more, and the atmospheric interference can be substantial (e.g., greater than 5% of the measured radiance or temperature). Accurate and reliable radiometric thermal images are particularly beneficial when monitoring farmland and/or operation of a mechanical or power generating installation, where relatively small changes in temperature over time (e.g., minutes, hours, days, weeks, months, or years), detected accurately, can significantly increase efficiency by minimizing unnecessary watering or maintenance and/or reduce operating costs due to inaccurately selected harvesting times or missed temperature indicated preventative maintenance.

Figure 4:
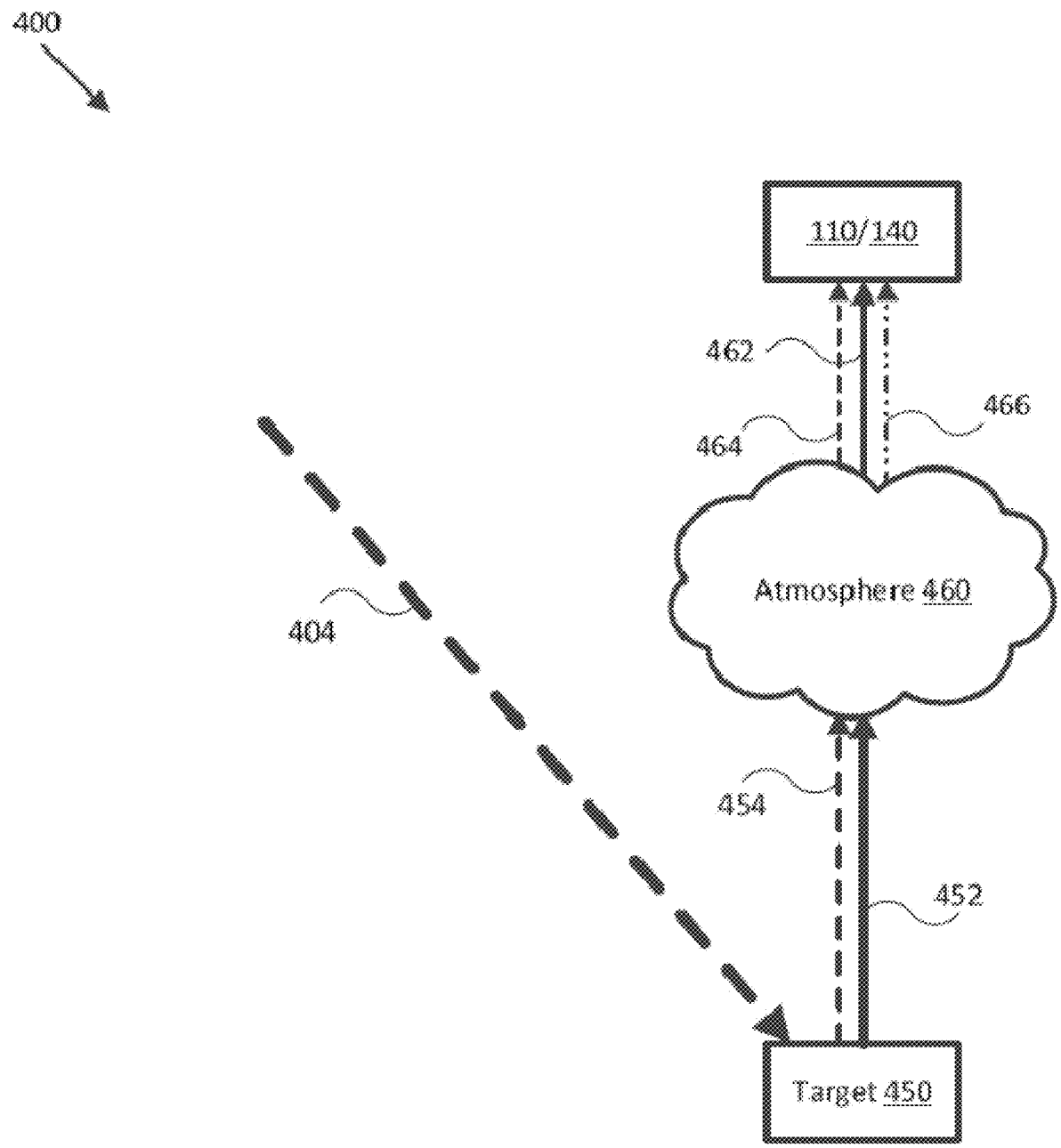
FIG. 4 illustrates a diagram of atmospheric interference and its effects on operation of an infrared imaging system in accordance with an embodiment of the disclosure.

FIG. 4 illustrates a diagram 400 of atmospheric interference and its effects on operation of infrared imaging system 100 in accordance with an embodiment of the disclosure. As shown in FIG. 4, target radiance 452 emitted by target 450 (e.g., the radiance that corresponds to the actual temperature of target 450) travels through atmosphere 460 and is partially attenuated or absorbed within atmosphere 460 and results in reduced target radiance 462 reaching infrared camera 140. Depending on the water content and the temperature of atmosphere 460, among other environmental conditions, the reduction in transmitted radiance can be approximately 5-20% at radiance path lengths approaching 150 meters.

Also shown in FIG. 4, background radiance 404 (e.g., from the sun, sky, other radiance sources) and atmospheric radiance 466 (e.g., self-radiance of atmosphere 460) can negatively impact the imagery captured by infrared camera 140. In FIG. 4, background radiance 404 impinges on the surface of target 450 that is being imaged by infrared camera 140, and causes reflected background radiance 454 to be directed towards infrared camera 140. The relative magnitude of reflected background radiance 454 depends on the emissivity of target 450. Reflected background radiance 454 is also partially attenuated/absorbed by atmosphere 460 and results in reduced reflected background radiance 464 reaching infrared camera 140, which can further skew any radiance measurement of target 450. However, in addition, atmosphere 460 can self-radiate and produce atmospheric radiation 466, which can also further skew any radiance measurement of target 450. For example, if target 450 is a glass of ice water, and the current environmental conditions are a relatively hot and humid day, the reported temperature of target 450 may be elevated by more than 20 degrees C.

Figure 5:
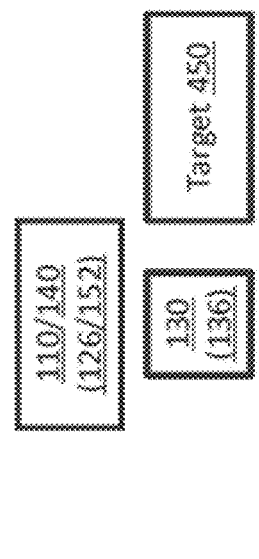
FIG. 5 illustrates a diagram of an infrared imaging system compensating for the atmospheric interference described with reference to FIG. 4, in accordance with an embodiment of the disclosure.

FIG. 5 illustrates a diagram 500 of infrared imaging system 100 compensating for the atmospheric and/or other interference described with reference to FIG. 4. FIG. 5 shows base station 130 and flight platform 110 (with camera 140) before flight platform has taken flight. Base station 130, flight platform 110, and/or infrared camera 140 may be implemented with a temperature sensor and/or a humidity sensor (e.g., other modules 126, 136, and/or 152), for example, and base station 130, flight platform 110, and/or infrared camera 140 may be configured to receive an air temperature and/or a relative humidity (e.g., before taking flight) and determine a function or look up table that provides a radiance (or temperature) adjustment to infrared images captured by infrared camera 140 as a function of distance to target 450 and/or altitude relative to 450. Subsequently, infrared imaging system 100 may be configured to use the distance and/or altitude dependent radiance adjustment to compensate for atmospheric interference when generating relatively accurate and reliable radiometric thermal images of target 450.

In some embodiments, base station 130 may receive (e.g., as user input) an estimated emissivity of target 450, for example, and based on an air temperature measured proximate to or at least approximately at the same altitude as target 450, include in the radiance adjustment a background radiance component configured to compensate for any portion of reflected background radiance 454 reaching infrared camera 140. In various embodiments, the background radiance component of the radiance adjustment may also be provided as a function of distance and/or altitude (e.g., due to atmospheric interference). In additional embodiments, infrared imaging system 100 may be implemented with a skyward aimed additional infrared camera and/or an irradiance detector (e.g., other modules 126), which can be configured to measure both the magnitude and a relative direction of background radiance 404 (e.g., relative to infrared camera 140 and/or the expected imaged surface of target 450). In such embodiments, the background radiance component of the radiance adjustment may be provided as a function of distance, relative altitude, and/or relative reflection angle (e.g., the angle(s) relative to background radiance 404 and 450 at which (reduced) reflected background radiance 464 impinges on infrared camera 140). In some embodiments, an irradiance detector may be limited to a particular spectrum, for example, and in further embodiments, may be implemented similar to infrared camera 140.

Similarly, infrared imaging system 100 may be configured to use the air temperature measured before takeoff to estimate the temperature of atmosphere 460 and include in the radiance adjustment an atmospheric self-radiance component configured to compensate for any portion of atmospheric radiance 466 reaching infrared camera 140. In various embodiments, the atmospheric self-radiance component of the radiance adjustment may also be provided as a function of distance and/or altitude (e.g., due to expected temperature gradients in atmosphere 460).

In general, infrared imaging system 100 may be configured to receive measurements or user input indicating various environmental conditions (e.g., air temperature, relative humidity, emissivity of the target, background radiance, temperatures of portions of infrared camera 140, and/or other environmental conditions), potentially in combination with various manufacturer provided conversion functions (e.g., stored in memory 146), and then use the measurements or user input to generate a radiance or temperature adjustment that may be provided as a look up table or other function dependent upon the relative altitude of infrared camera 140, the distance to target 450, the direction and/or magnitude of background radiance 404, and/or states of flight platform 110 and/or infrared camera 140. For example, such radiance or temperature adjustment may be dynamically updated with newly measured environmental conditions as flight platform 110 moves about target 450.

Figure 6B:
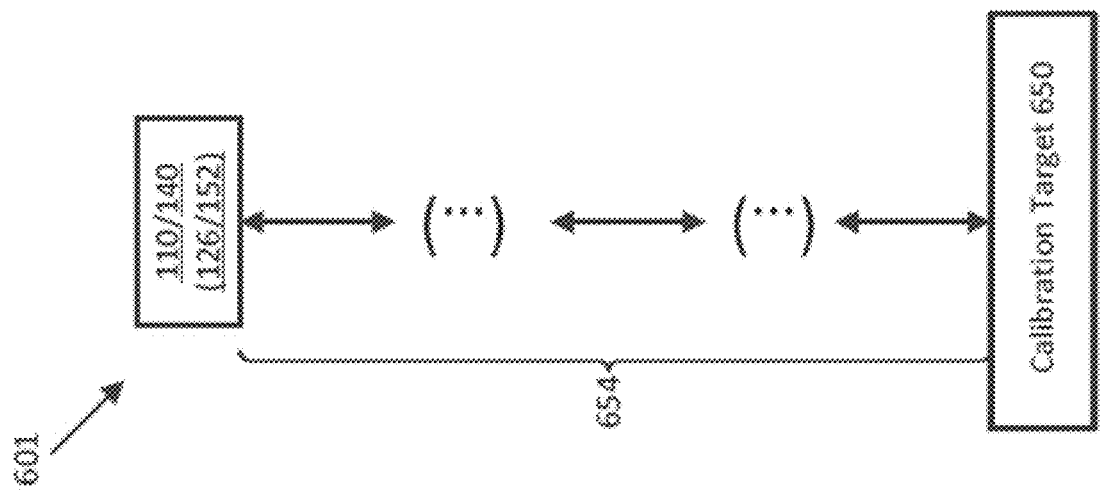
FIGS. 6A-B illustrate diagrams of an infrared imaging system compensating for the atmospheric and/or other interference described with reference to FIG. 4, in accordance with an embodiment of the disclosure.
Figure 6A:
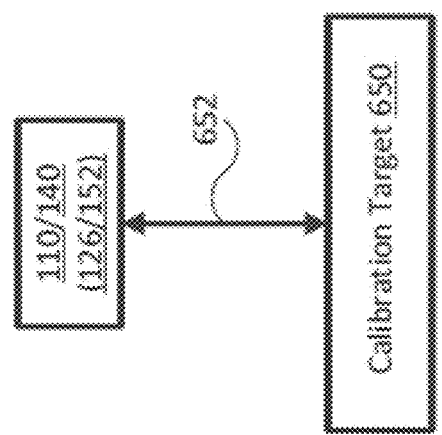

FIGS. 6A-B illustrate diagrams 600-601 of infrared imaging system 100 compensating for the atmospheric and/or other interference described with reference to FIG. 4. More specifically, FIGS. 6A-B illustrate flight platform 652 adjusting a relative altitude of infrared camera 140 above a calibration target 650 (e.g., a relatively large thermally uniform target, such as a parking lot) to generate a radiance or temperature adjustment as a function of relative altitude using a series of environmental measurements and infrared images taken at approximately the same time as the relative altitude is adjusted. Using the assumption that the atmospheric and/or other interferences are approximately zero at small relative altitudes, the magnitude of the various interferences can be measured directly as a function of altitude and then used to generate a direct radiance or temperature adjustment.

For example, FIG. 6A shows flight platform 110 (with camera 140) disposed above calibration target 650 at a relatively small relative altitude 652 (e.g., 1-5 meters). Infrared imaging system 100 may be configured to image calibration target 650 and/or measure an air temperature and/or relative humidity, among other environmental conditions, at small relative altitude 652, which may be defined as an altitude or range of altitudes where the atmospheric interference is less than or equal to 5% of the measured radiance of calibration target 650. Infrared imaging system 100 may be configured to use such measurements as a baseline with which to generate a direct radiance adjustment, as described herein.

FIG. 6B shows flight platform 110 periodically stopping at different relative altitudes before reaching relatively large relative altitude 654, which may be defined as an altitude or range of altitudes where the atmospheric interference is greater than 5% (e.g., typically greater than 8%) of the measured radiance of calibration target 650. As described with reference to FIG. 5, flight platform 110 and/or infrared camera 140 may be configured to measure various environmental conditions (e.g., air temperature, relative humidity, background radiance (direction and/or magnitude), temperatures of portions of infrared camera 140, and/or other environmental conditions) at each different relative altitude, potentially in combination with various manufacturer provided conversion functions, and then use the measurements to generate a direct radiance or temperature adjustment that may be provided as a look up table or other function dependent upon the relative altitude of infrared camera 140, the distance to target 450, the direction and/or magnitude of background radiance 404, and/or states of flight platform 110 and/or infrared camera 140. Such lookup table or function may be used to extrapolate beyond relative altitude 654 to larger relative altitudes, for example.

In alternative embodiments, calibration target 650 may take the form of a vertical wall, for example, and flight platform 110 may be configured to generate a series of measurements by moving from a relatively close horizontal proximity to vertical calibration target 650 to a relatively far horizontal distance from vertical calibration target 650 (e.g., similar in length to relative altitudes 652 and 654), which can be used to estimate a direct radiance adjustment based on distance to calibration target 650 rather than a relative altitude. In such embodiments, the direct radiation adjustment may be further refined by applying an altitude correction factor (e.g., as a function of altitude) that helps compensate for altitude dependent environmental effects (e.g., due to change in temperature, relative humidity, and/or other environmental characteristics that can be modeled or statistically estimated and provided as a manufacturer supplied lookup table or function).

In various embodiments, flight platform 110 may include a range finder (e.g., a laser range finder) and/or a visible light laser pointer (e.g., other modules 126), configured to aim substantially at the same area as infrared camera 140 (e.g., at a central portion of an infrared image captured by infrared camera 140), for example, to provide an extremely accurate measure of a distance to target 450 and/or calibration target 650 or to provide a visible marker indicating where infrared camera 140 is aimed (e.g., an inexpensive embodiment of GNSS 118 may be used to provide a relatively rough measure of a distance to target 450 and/or calibration target 650). In various embodiments, such laser based devices may be configured to produce light that is detectable by infrared camera 140 or by an additional visible light camera (e.g., other modules 126) that is also configured to be aimed in substantially the same area (e.g., with at least partially overlapping FOVs) so as to provide positional feedback to controller 112 and/or a user of base station 130. For example, infrared imaging system 100 may be configured to mark or "paint" with visible laser light one or more portions of target 450 that are above or below a predetermined or set temperature threshold or temperature excursion, for example. In alternative embodiments, base station 130 may include a laser pointer that can be used to mark a particular target, and flight platform 110 may be configured to detect the mark and image one or more views of the marked target with infrared camera 140.

The different methods of generating the radiance adjustment, described with reference to at least FIGS. 5-6B, and/or portions of the different methods, may be used interchangeably with each other to help refine the radiance adjustment and provide a reliable and accurate radiometric thermal image of target 450, as described herein.

Figure 7:
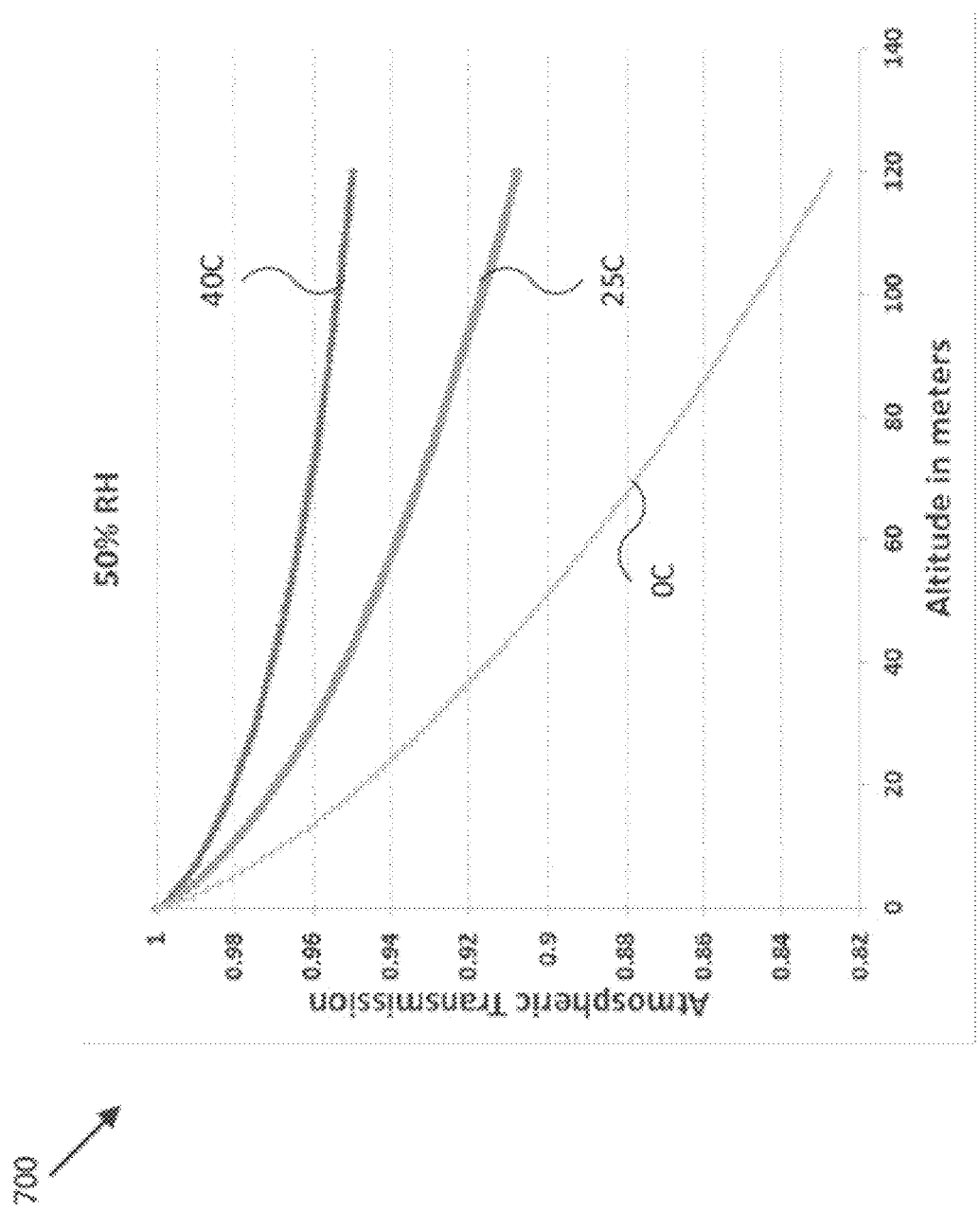
FIG. 7 illustrates a graph of atmospheric interference at a set relative humidity for various temperatures as a function of altitude in accordance with an embodiment of the disclosure.

FIG. 7 illustrates a graph 700 of atmospheric interference at a set relative humidity of 50% for various temperatures (0, 25, and 40 degrees C.) as a function of altitude in accordance with an embodiment of the disclosure. As can be seen from FIG. 7, just atmospheric absorption component of the atmospheric interference can be greater than 5% at relative altitudes as small as 20 meters.

Figure 8:
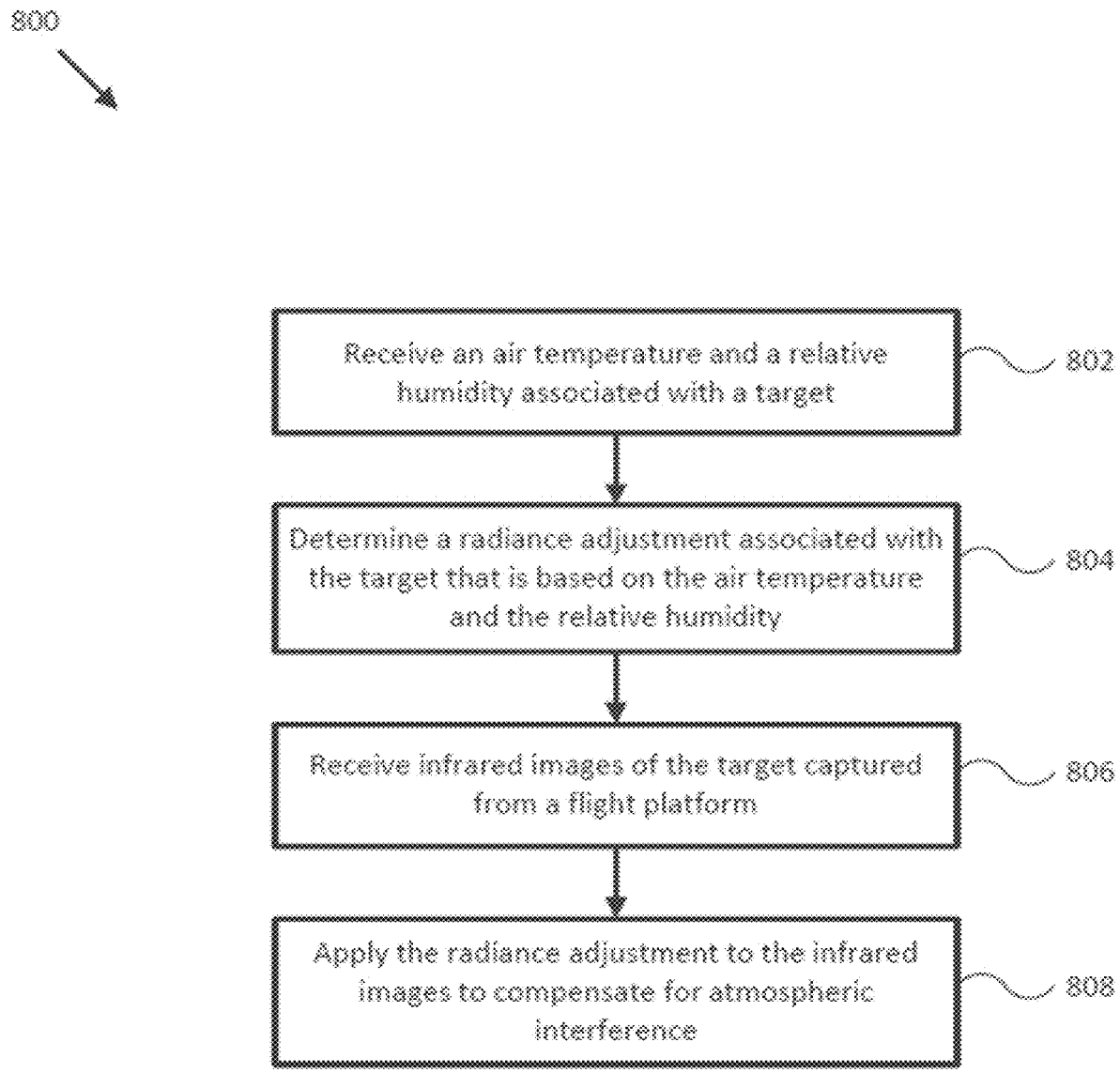
FIG. 8 illustrates a flow diagram of various operations to operate an infrared imaging system in accordance with an embodiment of the disclosure.

FIG. 8 illustrates a flow diagram 800 of various operations to operate infrared imaging system 100 in accordance with an embodiment of the disclosure. In some embodiments, the operations of FIG. 8 may be implemented as software instructions executed by one or more logic devices associated with corresponding electronic devices, sensors, and/or structures depicted in FIGS. 1-2. More generally, the operations of FIG. 8 may be implemented with any combination of software instructions and/or electronic hardware (e.g., inductors, capacitors, amplifiers, actuators, or other analog and/or digital components).

It should also be appreciated that any step, sub-step, sub-process, or block of process 800 may be performed in an order or arrangement different from the embodiments illustrated by FIG. 8. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 800 is described with reference to systems described in FIGS. 1-2, process 800 may be performed by other systems different from those systems and including a different selection of electronic devices, sensors, assemblies, mobile structures, and/or mobile structure attributes.

At block 802, an air temperature and/or a relative humidity associated with a target are received. For example, controller 112 may be configured to receive an air temperature and/or a relative humidity measurement that is associated with target 450 from a temperature sensor and/or a humidity sensor (e.g., other modules 126) of flight platform 110. Such air temperature and/or relative humidity measurement may be associated with target 450 by being measured proximate to an area near target 450 and/or at an altitude approximately the same as that for target 450. In some embodiments, other environmental characteristics may be measured and/or input by a user.

At block 804, a radiance adjustment associated with a target and based on an air temperature and/or a relative humidity is determined. For example, controller 112 may be configured to determine a radiance adjustment associated with target 450 and based on the air temperature and/or a relative humidity measurement received from other modules 126 in block 802. In some embodiments, the radiance adjustment may compensate primarily for atmospheric interference, as described herein. In other embodiments, the radiance adjustment may be based on various additional environmental characteristics and compensate for other environmental interference, such as atmospheric self-emission, background reflection radiance, and/or other detrimental environmental effects, as described herein.

At block 806, infrared images of a target captured from a flight platform are received. For example, controller 112 may be configured to receive infrared images from infrared camera 140 coupled to flight platform 110. In various embodiments, flight platform 110 may be in flight over or near target 450 and be configured to aim infrared camera 140 to image target 450.

At block 808, a radiance adjustment is applied to infrared images to compensate for atmospheric interference. For example, controller 112 may be configured to apply the radiance adjustment determined in block 804 to the infrared images received in block 806 to compensate for atmospheric interference between infrared camera 140 and target 450 and/or for other types of interference and/or environmental effects, as described herein.

In accordance with embodiments described herein, infrared imaging system 100 may be configured to inspect and/or monitor a solar power array, other power generating structures, and/or other structures. Because infrared imaging system 100 can provide highly accurate and reliable radiometric thermal images of such power generating structures, embodiments are able to help increase efficiency by reliably and accurately pinpointing inefficient (e.g., dirty) and/or malfunctioning solar panels or solar panel structures (e.g., structures within the individual solar panels) and by minimizing otherwise unnecessary maintenance and/or by reducing operating costs due to missed temperature indicated preventative maintenance.

Figure 9:
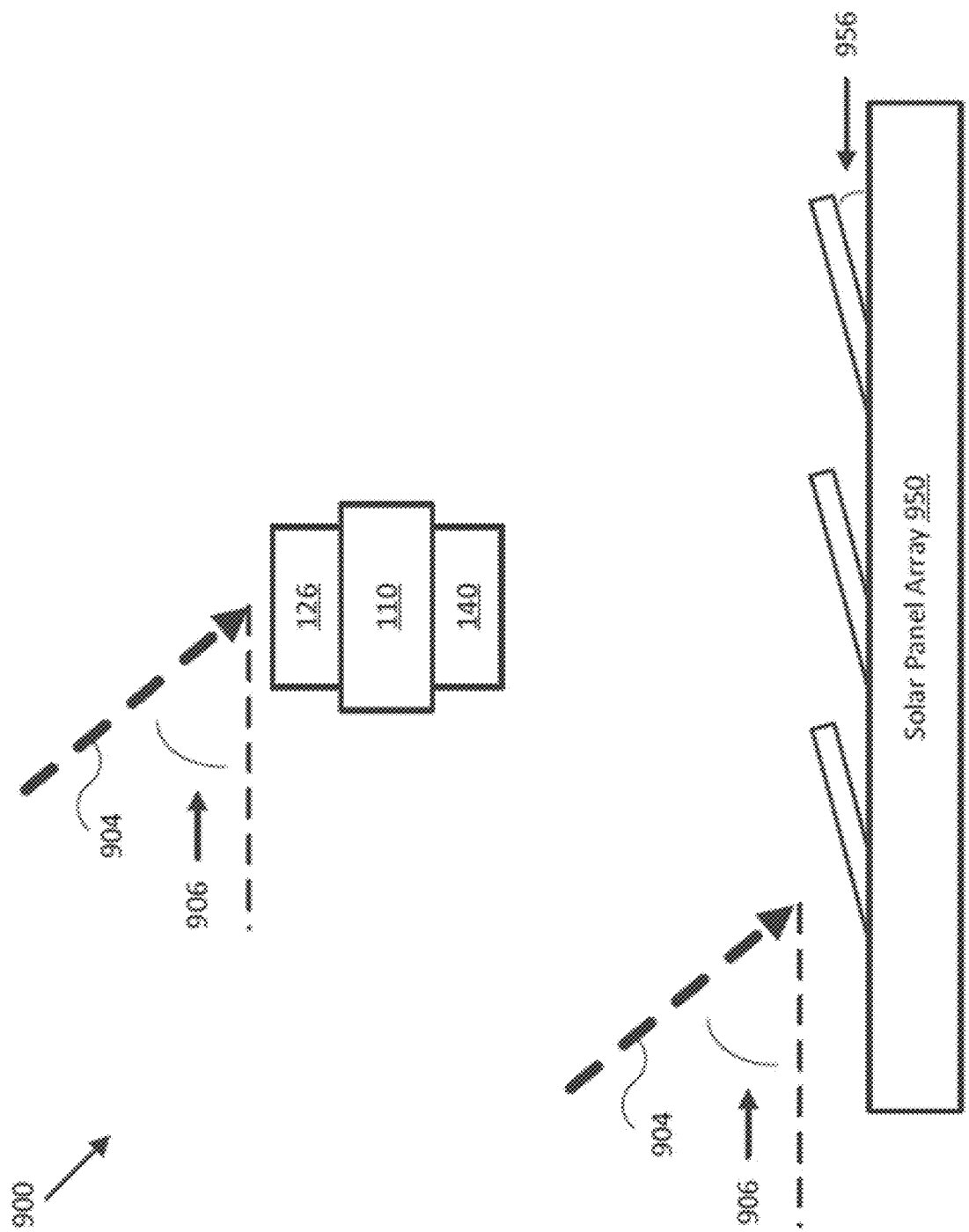
FIG. 9 illustrates a diagram of an infrared imaging system monitoring a structure, in accordance with an embodiment of the disclosure.

FIG. 9 illustrates a diagram 900 of infrared imaging system 100 monitoring a solar panel array 950, in accordance with an embodiment of the disclosure. As shown in FIG. 9, infrared imaging system 100 includes flight platform 100 implemented with infrared camera 140 imaging solar panel array 950 and an upward facing irradiance detector (e.g., other modules 126) configured to measure a magnitude and/or a direction of background radiance 904 (e.g., shown in FIG. 9 impinging irradiance detector 126 and solar panel array 950). Infrared imaging system 100 may be configured to use the magnitude and/or direction of background radiance 904 to provide an accurate measure of the operational efficiency of solar panel array 950.

For example, in one embodiment, infrared imaging system 100 may be configured to use the measured background radiance 904 to compensate for an emissivity of and/or a reflected background radiance provided by solar panel array 950. In some embodiments, infrared imaging system 100 may be configured to subtract the expected reflected background radiance (e.g., based on the measured magnitude of background radiance 904 and/or a combination of angle of incidence 906, solar panel angle 956, and/or a relative position and/or orientation of infrared camera 140) from infrared images captured by infrared camera 140 to produce radiometric thermal images of solar panel array 950. In various embodiments, infrared imaging system 100 may be configured to change a position and/or orientation of flight platform 110 and/or infrared camera 140 to reduce a reflected background radiance (e.g., by moving out of a direct reflection of a localized source of background radiation, such as the sun, from solar panel array 950).

In another embodiment, infrared imaging system 100 may be configured to use the measured background radiance 904 to determine an expected thermal profile for solar panel array 950 (e.g., including individual panels and/or panel structures), based on the expected conversion rate of incident radiance to output energy, for example, and to detect absolute quantitative deviations from the expected thermal profile (e.g., as opposed to more qualitative relative thermal differences).

In a further embodiment, infrared imaging system 100 may be configured to use the measured background radiance 904 to determine an estimated emissivity for solar panel array 950 (e.g., including individual panels and/or panel structures), based on the measured background radiance and an estimated or measured reflected radiance from a functioning portion of solar panel array 950 (e.g., as determined by other measured characteristics, including thermal characteristics). Such estimated emissivity may be used to characterize a surface of an imaged target, such a solar panel array 950, a structure roof, a tarmac, a surface of an aircraft, and/or other surfaces of an imaged target.

In addition, any of the methods described herein to compensate for atmospheric and/or other interference may be used in combination with the methods described with reference to FIG. 9 to help reduce such errors in resulting radiometric thermal images of solar panel array 950.

By providing highly accurate and reliable (e.g., reproducible) radiometric thermal images of targets, embodiments of the present disclosure enable airborne inspection and monitoring techniques that are significantly more utilitarian than conventional techniques. For example, embodiments of infrared imaging system 100 may be configured to image a roof of a structure and determine, based on temperature differences across the surface of the roof that are detectable using techniques disclosed herein, that portions of the roof are compromised and exhibit moisture saturation above that acceptable for a thermally efficient and weatherproof roof. Such measurements may include an estimation of an emissivity of an imaged surface of a target (e.g., such as a roof or solar panel array 950) based on a measured background radiance and an infrared image of the target. For example, for some materials, a relatively low emissivity estimation may indicate moisture saturation, whereas a relatively high emissivity estimation may indicate moisture beading.

Figure 10:
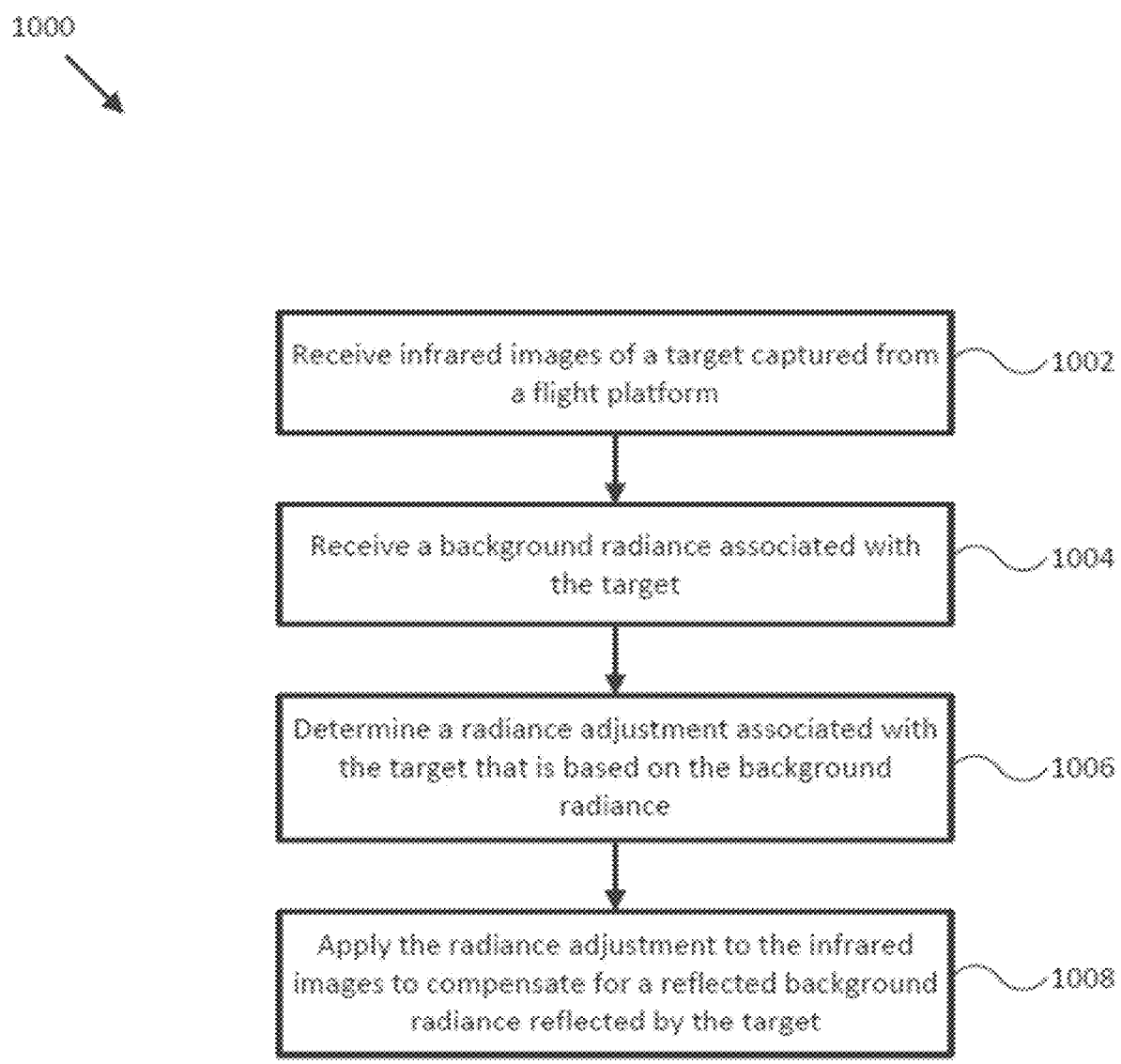
FIG. 10 illustrates a flow diagram of various operations to operate an infrared imaging system in accordance with an embodiment of the disclosure.

FIG. 10 illustrates a flow diagram 1000 of various operations to operate infrared imaging system 100 in accordance with an embodiment of the disclosure. In some embodiments, the operations of FIG. 10 may be implemented as software instructions executed by one or more logic devices associated with corresponding electronic devices, sensors, and/or structures depicted in FIGS. 1-2. More generally, the operations of FIG. 10 may be implemented with any combination of software instructions and/or electronic hardware (e.g., inductors, capacitors, amplifiers, actuators, or other analog and/or digital components).

It should also be appreciated that any step, sub-step, sub-process, or block of process 800 may be performed in an order or arrangement different from the embodiments illustrated by FIG. 10. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1000 is described with reference to systems described in FIGS. 1-2, process 1000 may be performed by other systems different from those systems and including a different selection of electronic devices, sensors, assemblies, mobile structures, and/or mobile structure attributes.

At block 1002, infrared images of a target captured from a flight platform are received. For example, controller 112 may be configured to receive infrared images of target/solar panel array 950 from infrared camera 140 coupled to flight platform 110. In various embodiments, flight platform 110 may be in flight over or near target 950 and be configured to aim infrared camera 140 to image target 950.

At block 1004, a background radiance associated with a target is received. For example, controller 112 may be configured to receive a background radiance measurement associated with target 950 from an irradiance detector (e.g., other modules 126) of flight platform 110. Such background radiance measurement may be associated with target 950 by being measured proximate to an area near target 950 and/or at an altitude approximately the same as that for target 950.

In some embodiments, other environmental characteristics may be measured and/or input by a user.

At block 1006, a radiance adjustment associated with a target and based on a background radiance is determined. For example, controller 112 may be configured to determine a radiance adjustment associated with target 950 and based on the radiance measurement received from other modules 126 in block 1004. In some embodiments, the radiance adjustment may compensate primarily for reflected background radiance, as described herein. In other embodiments, the radiance adjustment may be based on various additional environmental characteristics and compensate for other environmental interference, such as atmospheric interference, atmospheric self-emission, background reflection radiance, and/or other detrimental environmental effects, as described herein.

At block 1008, a radiance adjustment is applied to infrared images to compensate for a reflected background radiance reflected by the target. For example, controller 112 may be configured to apply the radiance adjustment determined in block 1006 to the infrared images received in block 1002 to compensate for reflected background radiance reflected by target 950 towards infrared camera 140 and/or to compensate for other types of interference and/or environmental effects, as described herein.

Additional steps and/or substeps may be incorporated into process 1000. For example, flight platform 110 may be implemented with irradiance detector 126 on top and infrared camera 140 facing down, and flight platform 110 may be configured to fly to a relative altitude sufficiently high to capture all of solar panel array 950 in a single image, which can be used (e.g., with position data provided by GNSS 118) to map solar panel array 950 and/or individual panels or structures of solar panel array 950 (e.g., relative to each other or a chart or geographical map of the location of solar panel array 950). In some embodiments, the geographical expanse of such an image may be limited, such as to limit distance based loss of detail in resultant radiometric thermal images. Infrared imaging system 100 may be configured to identify each panel in the resulting image, such as by a provided mapping of identification numbers for panels of solar panel array 950.

After such mapping, flight platform 110 may be configured to reduce an altitude or otherwise adjust a position of infrared camera 140 to allow for relatively high resolution/detail inspection of individual panels of solar panel array 950. Infrared imaging system 100 may be configured to analyze resulting radiometric thermal images for system malfunctions and/or inefficiencies by generating a histogram over a portion of solar panel array 950 or by using pattern analysis (e.g., based on thermal differences) applied to images of panels of solar panel array 950 to detect system malfunctions and/or inefficiencies and/or to estimate overall system operational efficiency.

In alternative embodiments, flight platform 110 may be implemented with irradiance detector 126 on top and infrared camera 140 facing down, and flight platform 110 may be configured to fly a grid pattern over solar panel array 950 while capturing infrared images of solar panel array 950 to generate an ortho-mosaic image of solar panel array 950. Such ortho-mosaic image can be used (e.g., correlated with position data provided by GNSS 118) to map solar panel array 950 and/or individual panels or structures of solar panel array 950 (e.g., relative to each other or a chart or geographical map of the location of solar panel array 950). Infrared imaging system 100 may be configured to identify each panel in the resulting ortho-mosaic image, such as by a provided mapping of identification numbers for panels of solar panel array 950.

After such mapping, flight platform 110 may be configured to reduce an altitude or otherwise adjust a position of infrared camera 140 to allow for relatively high resolution/detail inspection of individual panels of solar panel array 950 and corresponding radiometric thermal image histogram analysis, pattern analysis, and/or other image or structure analysis, as described herein. Such analysis may include pattern recognition and/or reporting of a percentage of array not performing according to a set or provided operating characteristic.

As noted herein, determining incidence angle 904 of background radiance (e.g., the angle of the sun relative to an orientation of infrared camera 140) can be critical to compensating for reflected background radiance. Glare or glint from the sun can degrade an irradiance measurement and any infrared images of solar panel array 950. In some embodiments, to help determine such angle(s), flight platform 110 may be implemented with multiple irradiance detectors aimed at different angles relative to flight platform 110 and/or infrared camera 140. In other embodiments, the time of day and absolute position and/or orientation of infrared camera 140 may be determined or measured and recorded with each captured infrared image and/or background irradiance measurement to allow post-capture calculation of angle 904.

In additional embodiments, a series of infrared images captured by infrared camera 140 may be analyzed to detect image artifacts and/or anomalies during flight that do not move relative to the image frame border; moving anomalies likely result from glint and can be compensated for or removed from analysis, non-moving anomalies likely indicate problem areas with solar panel array 950 that should be investigated further. In various embodiments, multiple time lapsed flights of flight platform 110 may be performed to allow for time differentiated comparisons of panels of solar panel array 950, which can be used to track degradation over time and indicate preemptive maintenance.

Figure 11:
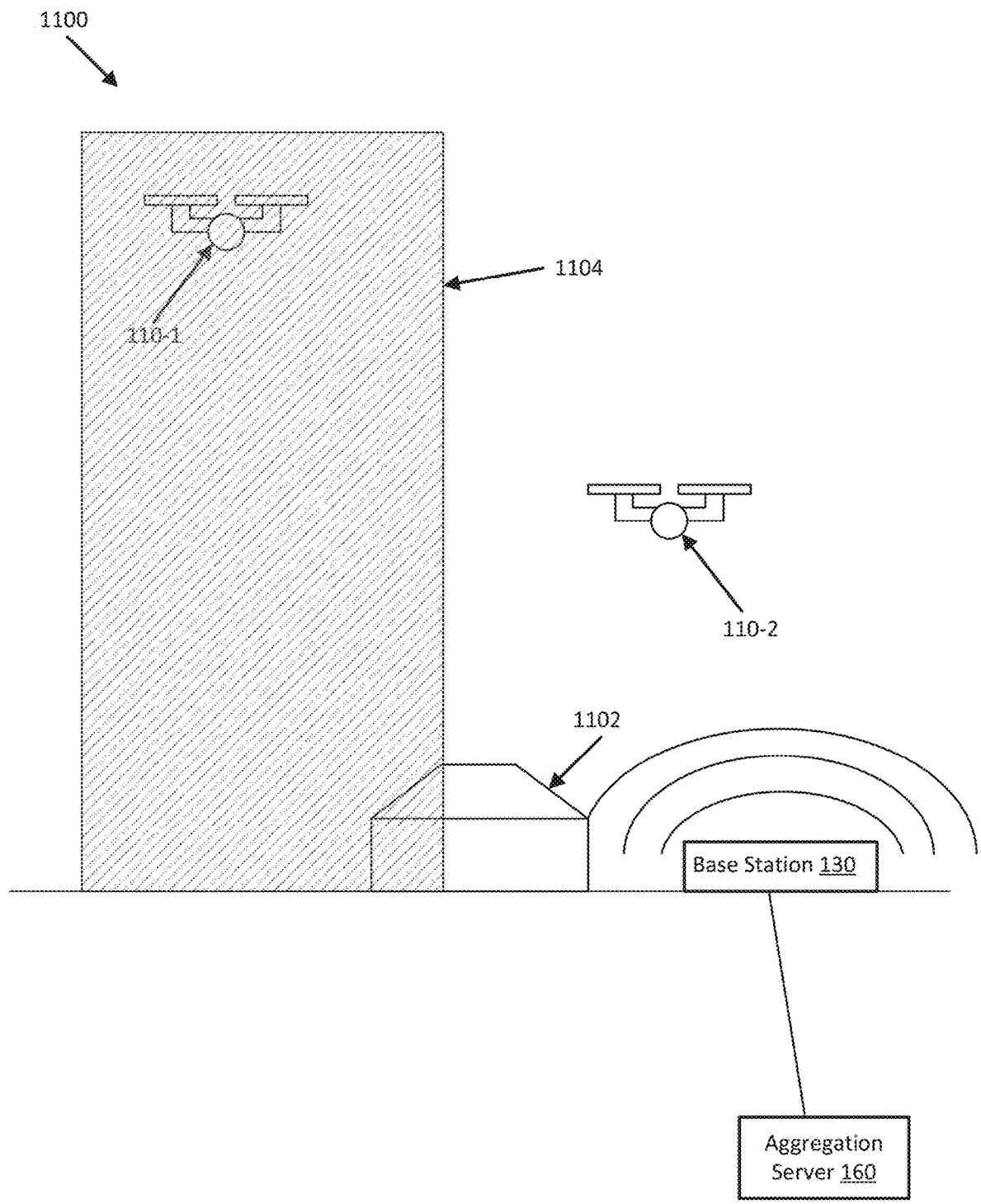
FIG. 11 illustrates a diagram of a plurality of unmanned aerial systems monitoring a structure, in accordance with an embodiment of the disclosure.

FIG. 11 illustrates a diagram of a plurality of unmanned aerial systems monitoring a structure, in accordance with an embodiment of the disclosure. FIG. 11 may include flight platforms 110-1 and 110-2. Flight platforms 110-1 and 110-2 may each include at least one infrared camera 140 and may be controlled by one or more base station 130. Flight platforms 110-1 and 110-2 may image a scene that may include structure 1102. Flight platform 110-1 may be in a first location at a first altitude and flight platform 110-2 may be in a second location at a second altitude. Flight platforms 110-1 and 110-2 may be commanded by, for example, one or more of base station 130 and/or aggregation server 160. For example, in certain embodiments, base station 130 may be the sole point of command for flight platforms 110-1 and/or 110-2. In other embodiments, flight platforms 110-1 and/or 110-2 may be commanded solely by aggregation server 160 (e.g., when a remote user may be commanding flight platforms 110-1 and/or 110-2) and/or may be commanded by a combination of or each of base station 130 and aggregation server 160.

In certain embodiments, one or both of flight platforms 110-1 and 110-2 may be communicatively connected to aggregation server 160. Flight platform 110-1 and/or 110-2 may image the scene and transmit data associated with the scene (e.g., thermal data) to the base station 130 and/or aggregation server 160 for constructing of a three-dimensional representation of the scene.

Flight platform 110-2 may be located within plume 1104. Flight platform 110-1 and/or 110-2 may include, for example, a nephelometer that may detect a count of particulates within the air. In FIG. 11, flight platform 110-1 may, for example, detect a high particulate count within plume 1104. In certain situations, flight platform 110-1 may detect that plume 1104 may not be a pollution plume (e.g., flight platform 110-1 may detect that plume 1104 is substantially the same temperature as the surrounding environment, may detect, with a carbon monoxide sensor, that carbon monoxide within plume 1104 is not substantially different from the surrounding environment, and/or may detect a normal amount of ozone within plume 1104). As such, flight platform 110-1, base station 130, and/or aggregation server 160 (e.g., a connected computing device and/or network) may determine that plume 1104 may be, for example, a dust cloud, and may adjust the determined irradiance and/or temperature of objects within plume 1104 accordingly. Additionally, flight platform 110-1 may image structure 1102. As flight platform 110-1 detects that it is within plume 1104, it may also adjust the determined irradiance and/or temperature of structure 1102 accordingly.

In another example, flight platform 110-1 may determine that plume 1104 may be a pollution plume. For example, flight platform 110-1 may determine that the temperature within plume 1104 is substantially higher than the surrounding environment, may determine that carbon monoxide and/or dioxide concentrations are significantly higher than the surrounding environment, may determine that the ground near the plume 1104 is indicative of a fire, detect air movement indicative of a leak, and/or other such determinations that may indicate that plume 110 is a pollution plume. Accordingly, flight platform 110-1, base station 130, and/or aggregation server 160 (e.g., a connected computing device and/or network) may adjust thermal readings from within the area for the presence of the pollution plume.

In certain other embodiments, for example embodiments lacking plume 1104, flight platform 110-1 and 110-2 may image the structure 1102 from the first location and the second location, respectively. As such, flight platforms 110-1 and/or 110-2, base station 130, aggregation server 160, and/or another such processor, may determine the differences in location and correct for the differences in location. The temperature and/or irradiance determined from flight platform 110-1 may be compared to that of flight platform 110-2. Possible errors may be determined from such comparisons and the differences may also be analyzed to determine, for example, environmental conditions such as wind, particulate levels, temperature differences, and/or other such conditions.

Also, flight platforms 110-1 and/or 110-2 may be equipped with one or more HDR cameras. Such HDR cameras may be more likely to saturate imaging objects at short imaging distances than at longer imaging distances. As such, flight platform 110-1, when imaging structure 1102, may be able to obtain a greater scene dynamic range than flight platform 110-2. As such, for example, if a greater dynamic range is desired, images from flight platform 110-1 may be used to construct two or three-dimensional models. Additionally or alternatively, in certain embodiments, filters may be applied to images obtained.

Certain embodiments may construct a two or three-dimensional representation of an area from multiple data sources (e.g., flight platforms 110-1, 110-2, and/or other additional sources). For example, information may be communicated from components of flight platforms 110-1 and/or 110-2 (e.g., infrared cameras, visual cameras, environment sensors, and/or other components coupled to flight platforms 110-1 and/or 110-2) to aggregation server 160. Aggregation server 160 may receive such information and construct a two and/or three-dimensional point model. In certain embodiments, aggregation server 160 may construct such points models may combining information from other sources. As such, information such as, for example, weather information and/or forecasts, barometer information from third parties, fire reports, information from other flight platforms and/or infrared cameras, satellite information, determinations made by other servers, and/or other such information. In certain other embodiments, flight platform 110, infrared camera 140, base station 130 and/or other devices may aid in or fully construct the two and/or three-dimensional point model.

As shown in FIG. 11, aggregation server 160 may be communicatively connected to base station 130. Base station 130 may be communicatively connected to flight platforms 110-1 and 110-2 (e.g., via remote data connections). As such, base station 130 may communicate information (e.g., commands) to flight platforms 110-1 and 110-2 and may receive information (e.g., thermal data) from flight platforms 110-1 and 110-2 and/or components coupled to flight platforms 110-1 and/or 110-2. In certain embodiments, base station 130 may also communicate with aggregation server 160. In such embodiments, information received from flight platforms 110-1 and/or 110-2 and/or components attached thereof may be communicated to aggregation server 160 from base station 130. In certain other embodiments, commands issued from aggregation server 160 may be communicated to flight platforms 110-1 and/or 110-2 and/or components attached thereof may be received by base station 130 and then communicated as such. Other embodiments may directly communicate instructions from aggregation server 160 to flight platforms 110-1 and/or 110-2 or components thereof (e.g., via a 4G or other wireless communications network).

Certain such representations may be periodically or continuously updated from new data received. As such, imaging data from flight platforms 110-1 and 110-2 may be communicated to, for example, aggregation server 160, to update such models. For example, a body of water such as a bay or a portion of an ocean may be monitored and/or updated based on imaging data. Such imaging may allow for the detection of, for example, variations of temperature within the body of water (e.g., hot and/or cold spots). Such information may allow for better aquatic farming. In certain such embodiments, aggregation server 160 may, for example, determine areas that may require additional imaging and/or information. For example, aggregation server 160 may determine that certain areas may not have been updated for a threshold period of time. As such, aggregation server 160 may provide requests and/or commands that a flight platform fly over and image an area. In certain embodiments, such commands may include, for example, commands, to overfly an area a plurality of times, a specific route to fly, areas to avoid, speed and/or altitude commands, and/or other such commands.

Additionally, aggregation server 160 may, receive information directed to a state of flight platforms 110-1 and/or 110-2. Aggregation server 160 may then, determine state characteristics (e.g., heading, flight speed, location, acceleration, time airborne, and/or other characteristics) of flight platforms 110-1 and/or 110-2 and adjust and/or correct information received from flight platforms 110-1 and/or 110-2 and/or infrared cameras attached thereof. For example, thermal data captured by such infrared cameras may be, for example, adjusted according to a determined speed and/or heading of the corresponding flight platform.

Additionally, aggregation server 160 may issue commands to flight platforms 110-1 and/or 110-2 responsive to the characteristics.

Figure 12:
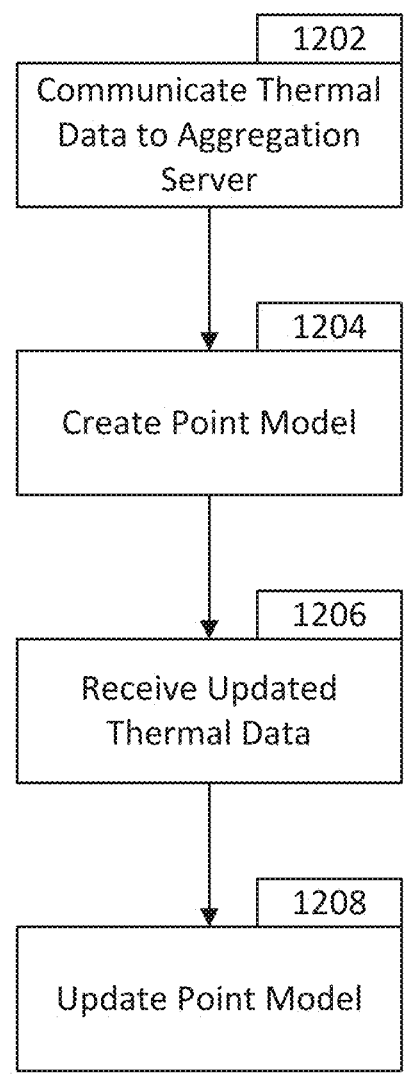
FIG. 12 illustrates a flow diagram of various operations to operate an infrared imaging system to generate a point model in accordance with an embodiment of the disclosure.

FIG. 12 illustrates a flow diagram of various operations to operate an infrared imaging system to generate a point model in accordance with an embodiment of the disclosure. In block 1202, thermal data may be communicated to the server. Thermal data may be, for example, thermal data, radiance data, temperature data, and/or other such type of data captured by an infrared camera. Additionally, in certain embodiments of block 1202, additional information (e.g., environmental data) may be communicated to the server. Such additional information may correct, adjust, and/or modify the thermal data. Also, the aggregation server may receive information directed to a state (e.g., heading, flight speed, location, acceleration, time airborne, and/or other characteristics) of the flight platform.

In block 1204, the server may construct a two and/or three-dimensional point model from, for example, information received in block 1202 and/or other information received from the flight platform, base station, infrared camera, and/or other sources. The point model may be, in certain embodiments, be used to generate a two and/or three-dimensional representation. For example, a two and/or three-dimensional thermal data (e.g., a model displaying detected temperatures) may be generated. Also, in certain such embodiments, information used to generate the point model may be corrected according to the state of the flight platform. The aggregation server may also detect thermal hotspots within the point model and detect when such hotspots are smaller than a certain threshold size (e.g., smaller than 10×10 pixels). Such small spots may, in certain conditions, indicate hotspots that are imaged by the infrared camera to be warmer and/or colder than the actual temperature. In such embodiments, the aggregation server may detect such hotspots that are below the threshold size and apply correction factors for such small spots.

In certain embodiments, concurrent with the generation of the point model, flight platforms and/or infrared cameras may be acquiring additional information. In certain such embodiments, the point model may be continuously generated and/or updated. As such, updated information may be received from the flight platform, infrared camera, and/or base station in block 1206. In certain embodiments, the server may request and/or provide instructions for the flight platform and/or infrared camera to acquire such additional information (e.g., provide flight routes) while other embodiments may have users command the flight platform and/or infrared camera to acquire such information (e.g., via commands from base station 130). In certain such embodiments, such commands may be issued responsive to information received associated with a state (e.g., heading, flight speed, location, acceleration, time airborne, and/or other characteristics) of the flight platform.

In block 1208, the point model may be updated with the information received in block 1206. In certain embodiments, the server may determine whether to update the point model with the information received and/or whether to assign a weight to the information received to increase and/or decrease their effect on the updated point model. Additionally, the server may, after updating the model, also determine whether certain parts of the point model need additional updating. If the server determines that additional updates are needed for certain portions of the model, additional instructions may be provided to the flight platform and/or infrared camera. In certain such embodiments, such additional information may be issued according to determined states of one or more flight platforms. As such, if the server determines that further information from a certain area is required, it may, for example, determine a flight platform those time of travel is lowest to such an area (e.g., a flight platform closest to the area or a flight platform already heading in a general direction of the area) and is not currently performing a task and provide instructions to the flight platform to obtain information from the area.

Figure 13:
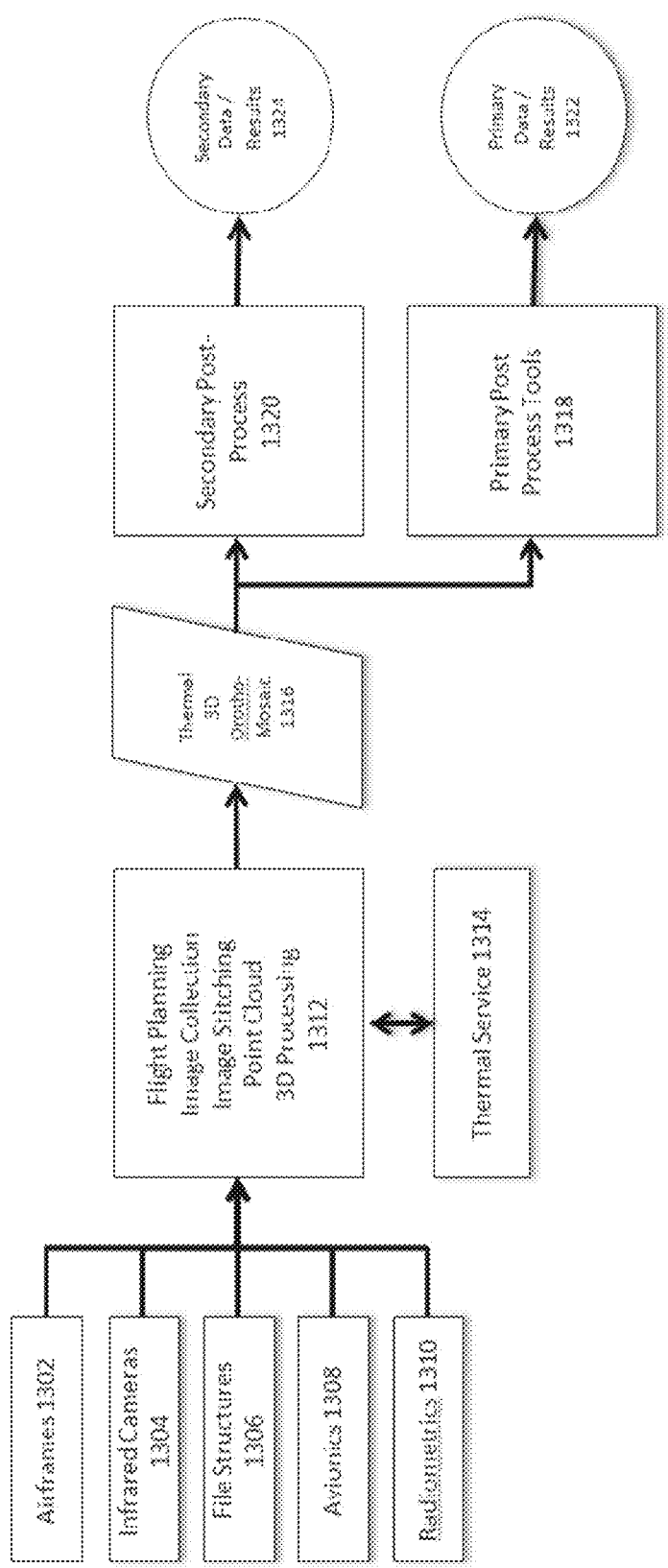
FIG. 13 illustrates a block diagram of a system for generating thermal ortho-mosiac images in accordance with an embodiment of the disclosure.

FIG. 13 illustrates a block diagram of a system for generating thermal ortho-mosiac images in accordance with an embodiment of the disclosure. The system in FIG. 13 may include airframes 1302 (e.g., one or more flight platforms 110), infrared cameras 1304 (e.g., one or more infrared cameras 140), file structures 1306 (e.g., data stored within one or more memories of flight platforms 110, infrared cameras 140, base station 130, and/or aggregation server 160), avionics 1308 (e.g., systems for piloting and/or control of flight platform 110 mounted on flight platform 110, base station 130, and/or aggregation server 160 and/or sensors such as velocity, heading, acceleration, impulse, position, and/or other such sensors configured to detect parameters associated with piloting of flight platform 110), radiometrics 1310 (e.g., additional sensors such as visible light sensors, pyrometers, and/or other such devices and/or techniques to measure radiometry of an object).

Data from airframes 1302, infrared cameras 1304, file structures 1306, avionics 1308, and/or radiometrics 1310 may be aggregated and/or used for certain purposes in block 1312. For example, thermal images may be collected and such images may be aggregated and/or stitched together. Additionally, thermal readings may be aggregated into a point cloud. Such a point cloud may be processed into a three-dimensional model (e.g., a three-dimensional thermal model of an environment). Also, such thermal data and/or models may be analyzed such that, for example, flight paths and/or other flight planning may be determined through such thermal data, thermal images, aggregated thermal images, point clouds, and/or three-dimensional models. In certain such embodiments, for example, one or more environmental conditions may be determined from the data and the flight paths and/or planning may be determined response to the conditions.

In certain embodiments, thermal services 1314 may provide techniques, tools, and/or other support or processes for the creation, aggregation, and/or analysis of the images, point cloud, and/or models in block 1312. For example, such thermal services may include image gain and/or offset normalization for one or multiple images, super-resolution techniques, point-cloud densification techniques, and/or radiometric processing. Generally, such services may correct data received from airframes 1302, infrared cameras 1304, file structures 1306, avionics 1308, and/or radiometrics 1310 for more accurate determination of thermal conditions of an environment. For example, such services may determine a path length, angle of incidence, speed, and/or altitude of flight platform 110, humidity, dust conditions, and/or temperature of the environment, solar intensity and position, and/or a field of view of infrared camera 140 and correct for such factors.

Data processed in block 1312 may be communicated to block 1316 to create a three-dimensional thermal mosaic. The three-dimensional thermal mosaic may be created from, for example, the point model created in block 1312. The three-dimensional thermal mosaic may use some or all of the points of the point model to render a three-dimensional thermal model of the environment.

Post-processing of the thermal ortho-mosaic may include primary post-processing performed by a provider and/or manufacturer of infrared camera 140 in block 1318 and/or by a secondary source in block 1320. Post-processing may include, for example, analysis of the three-dimensional thermal model (e.g., determination of higher temperature areas, areas of abnormal temperature, and/or other such determinations), aggregating results of a plurality of point cloud models and/or ortho-mosaics, and/or other such post-processing of the thermal ortho-mosaic. In certain embodiments, such post-processing may be fully or partially accomplished by, for example, software provided by the provider and/or manufacturer or secondary source. The results of such post-processing may then be outputted in blocks 1322 and 1324.

Figure 14:
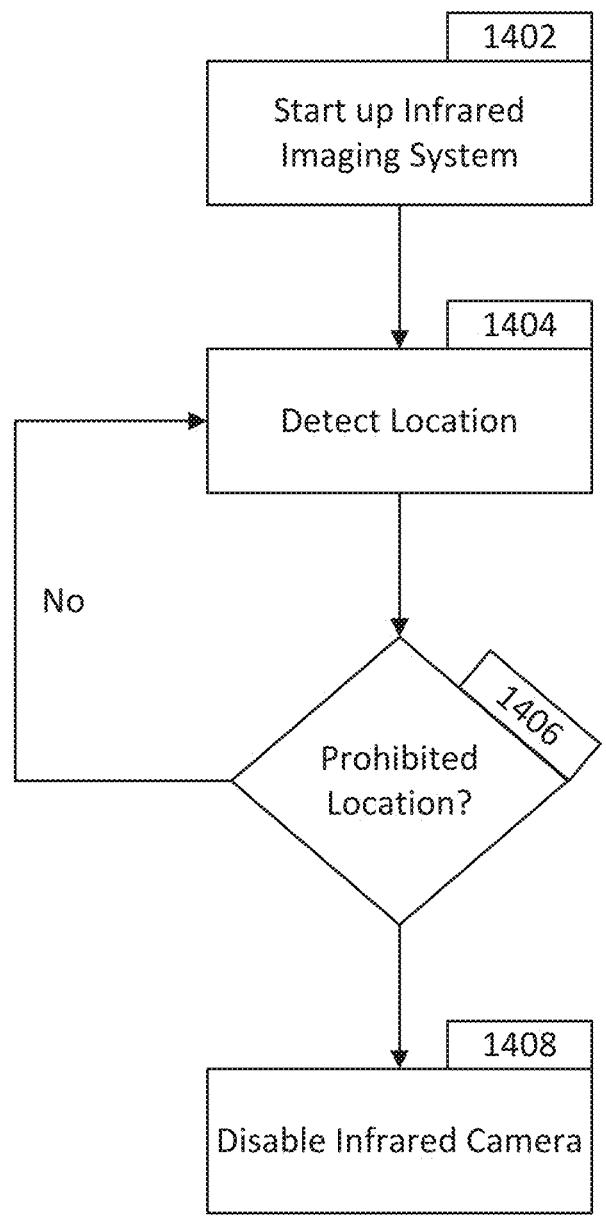
FIG. 14 illustrates a flowchart of a process for disabling a thermal camera of a thermal imaging system in accordance with an embodiment of the disclosure.

FIG. 14 illustrates a flowchart of a process of disabling a UAS camera in accordance with an embodiment of the disclosure. For example, certain governmental regulations prohibit export of UASs and/or infrared cameras with certain capabilities to certain countries or areas. Additionally, certain areas may prohibit the flight of UASs with certain infrared cameras (e.g., all infrared cameras or infrared cameras with certain capabilities). Such areas and/or countries where export is prohibited or where flight of UASs with certain infrared cameras is prohibited may be referred to as "prohibited areas." The process illustrated in FIG. 14 may be performed to detect a location of infrared camera 140, which may be mounted to flight platform 110, and determine whether infrared camera 140 is located within such a restricted area. Additionally, the process illustrated in FIG. 14 may also be performed by an embodiment of infrared camera 140 that may not be coupled to a flight platform and thus, not receive data from a flight platform.

In block 1402, an infrared imaging system (e.g., infrared imaging system 100) may be powered up. As such, previous to block 1402, the infrared imaging system may be shut off or in a sleep mode. Using infrared imaging system 100 as an example, in block 1402, power may be provided to one or more systems of infrared imaging system 100 (e.g., one or more systems of flight platform 110, base station 130, and/or infrared camera 140).

In block 1404, after power up of infrared imaging system 100, infrared imaging system 100 may detect its location or the location of infrared camera 140 within infrared imaging system 100. In certain situations, infrared camera 140 may be coupled to flight platform 110 and thus certain systems of infrared camera 140 and flight platform 110 may be communicatively connected. Accordingly, the location of infrared camera 140 may be determined with data from one or more of GNSS 118, orientation sensor 114, other modules 126, communications module 120, gyroscope/accelerometer 116, GNSS 150, orientation sensor 148, communications module 144, other modules 152, and other systems of infrared imaging system 100.

For example, infrared camera 140 may receive data from GNSS 118 and other systems of flight platform 110. Infrared camera 140 may then use data from GNSS 118 (e.g., location data from an external location data source) to calculate the location of infrared camera 140. In another example, data from GNSS 150 may be used by infrared camera 140 to calculate the location of infrared camera 140. In a further example, infrared camera 140 may receive data from communications module 120 and/or 144. Data from communications module 120 and/or 144 may include information that infrared camera 140 may then use to calculate its location.

In another example, infrared camera 140 may be coupled to flight platform 110. Flight platform 110 may calculate the location of flight platform 110 and/or infrared camera 140 (e.g., with controller 112 and/or other systems) through, for example, data from GNSS 118 and/or 150 or other systems, and may then communicate the calculated location to infrared camera 140.

In certain embodiments, the location of infrared camera 140 may be determined during power up (e.g., concurrent with block 1402) or shortly after power up. Additionally, the infrared imaging system 100 and/or infrared camera 140 may, after power up, continuously check to confirm location of infrared camera 140. As such, after power up, data from GNSS 118 and/or 150, communications module 120 and/or 144, and other systems may be used to calculate the location of infrared camera 140. In certain such embodiments, the location of infrared camera 140 may be calculated periodically (e.g., after a pre-defined period of time), when movement past a certain threshold of flight platform 110 and/or infrared camera 140 (e.g., past a certain distance, acceleration, or velocity), when communications module within infrared imaging system 100 receives certain commands, and/or when certain other conditions are met.

In certain situations, communication between GNSS 118 and/or 150 and certain navigational data sources (e.g., satellites, cellular phone towers, and/or other devices) may be lost. In such situations, other systems within infrared imaging system 100 may be used to determine the location of infrared camera 140. Such determinations may, in certain embodiments, be based off of a last calculated location (e.g., a location last determined with GNSS data) and additional calculations may be performed to determine a new position of infrared camera 140 from the last calculated location. For example, data from gyroscope/accelerometer 116, as well as other systems that may determine dynamic data associated with movement of the inertia camera, such as inertial measurement systems, may be used to determine a distance and/or direction traveled from the last calculated location and, thus, calculate the current location of infrared camera 140.

In certain embodiments, a configuration of infrared camera 140 may also be determined. As such, infrared camera 140 may include data, such as internal codes, indicating its configuration. Infrared camera 140, flight platform 110, base station 130, and/or other systems of infrared imaging system 100 may determine the configuration of infrared camera 140.

After the location of infrared camera 140 has been determined in block 1404, whether infrared camera 140 is in a prohibited location is then determined in block 1406. In certain embodiments a memory within imaging system 100 may include data indicating a list of prohibited locations. The calculated location of infrared camera 140 may then be checked against the list of prohibited locations. The prohibited locations may be, for example, locations where export of infrared camera 140 is prohibited or where operation of UASs are not allowed. In certain embodiments, the list may be updated, e.g., communications may be received by communications modules 120, 136, and/or 144 indicating an updated listing of prohibited locations. Communications indicating an updated listing may be received when areas are added or deleted from the list, may be periodically received, or may be received due to another reason. Prohibited locations may include countries, states, provinces, cities, and/or regions within the countries, states, provinces, and cities, as well as other geographical areas. Certain such embodiments may update or attempt to update the list of prohibited locations after the location of infrared camera 140 has been determined. If the calculated location of infrared camera 140 is within a prohibited location, the process may continue to block 1408. If the infrared camera 140 is determined to not be within a calculated location, the process may revert to block 1404 or may finish.

Certain embodiments may, in addition to determining whether the calculated location is a prohibited location, also determine whether the configuration of infrared camera 140 is prohibited within the prohibited location. In such an example, only certain configurations of infrared camera 140 may be prohibited within a prohibited location. Accordingly, the configuration of the infrared camera 140 may then be checked to determine whether the configuration is a configuration prohibited within the location. If infrared camera 140 is a prohibited configuration that is currently located within a prohibited location, the process may then continue to block 1408. Otherwise, the process may revert to block 1404 or may finish.

In block 1408, infrared camera 140 is disabled. Infrared camera 140 may be disabled temporarily (e.g., infrared camera 140 or certain functions of infrared camera 140 may not function while infrared camera 140 is determined to be within the prohibited location) or permanently (e.g., infrared camera 140 or certain functions of infrared camera 140 may be permanently disabled). Additionally or alternatively, the quality of data and/or images outputted by infrared camera 140, such as framerate, resolution, color depth, and other parameters, may also be affected in block 1408. Disabling infrared camera 140 may prevent infrared camera 140 from obtaining certain or all images and/or video. Infrared camera 140 may be disabled electronically (e.g., via software that may shut off certain functions) or mechanically (e.g., through actuation of a fuse or through mechanical actions such as, for example, removing wires or damaging portions of infrared camera 140 in other ways).

In addition to or alternative to disabling infrared camera 140, in block 1408, flight platform 110 may also be prevented from operating. Accordingly, if infrared camera 140, flight platform 110, or another portion of infrared imaging system 100 is detected to be within a prohibited location, flight platform 110 may be instructed to not take off despite operator inputs or be instructed to land. Additionally, an indication or message may be displayed on, for example, user interface 132 of base station 130 to communicate to the user that infrared camera 140 and/or flight platform 110 is operating in a prohibited location.

Figure 15:
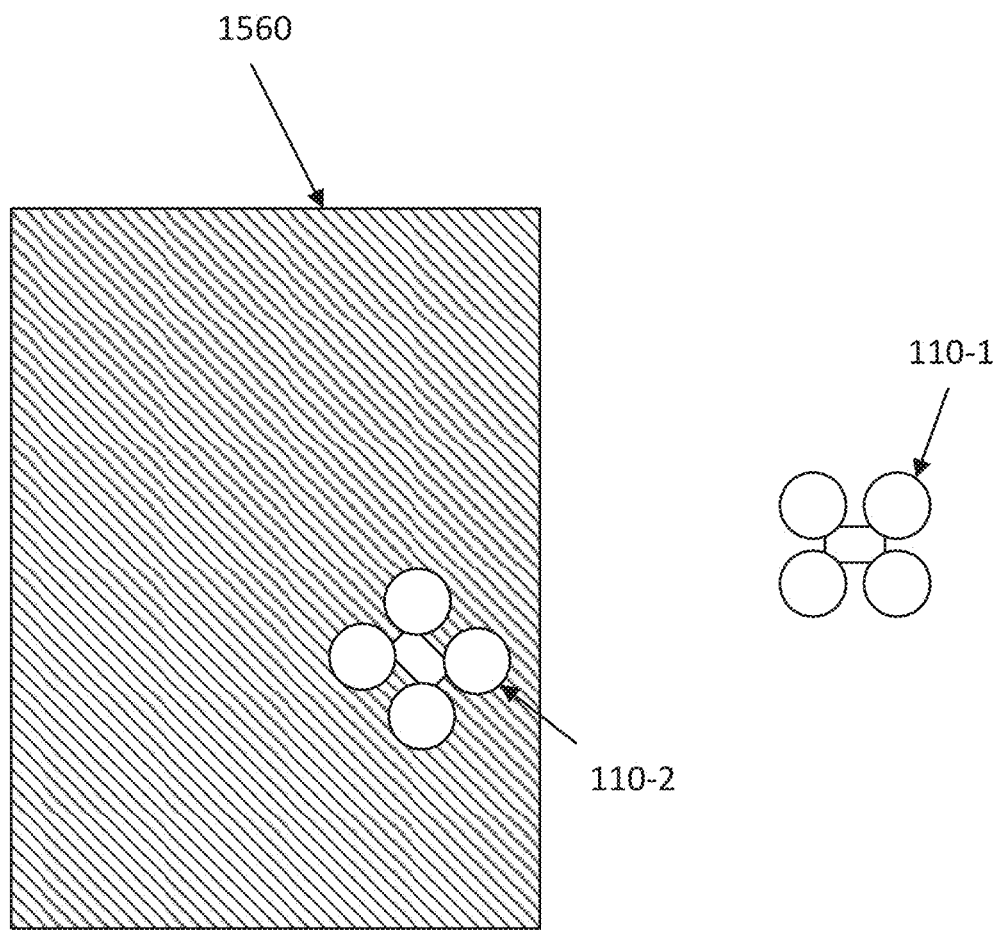
FIG. 15 illustrates an example of disabling a thermal camera of a thermal imaging system according to the process of FIG. 14 in accordance with an embodiment of the disclosure.

FIG. 15 illustrates an example of disabling a UAS camera according to the process of FIG. 14 in accordance with an embodiment of the disclosure. FIG. 15 illustrates two flight platforms, flight platform 110-1 and 110-2, that may each include an infrared camera coupled to the respective flight platforms. Flight platform 110-1 may be located outside of prohibited location 1560, while flight platform 110-2 may be located within prohibited location 1560.

Flight platform 110-1 may determine its location and then determine that it is not within prohibited location 1560. Accordingly, flight platform 110-1 and/or its attached infrared camera may operate normally.

Flight platform 110-2 may determine its location and then determine that it is within prohibited location 1560. Flight platform 110-2 may also determine the configuration of its infrared camera. If the configuration of its infrared camera is prohibited to be within prohibited location 1560 and/or prohibited to be exported to prohibited location 1560, flight platform 110-2 and/or its attached infrared camera may disable the attached infrared camera.

In certain embodiments, the attached infrared camera of flight platform 110-2 may be permanently disabled. In other embodiments, the attached infrared camera may be temporarily disabled. That is, once it is detected that the infrared camera is outside of prohibited location 1560 (e.g., may be at, for example, the location where flight platform 110-1 is illustrated to be at), the disabled portions of the infrared camera may be functional again. In addition, some embodiments may determine when a flight platform and/or its attached infrared camera has entered a prohibited location (such as moving from the position of flight platform 110-1 to the position of flight platform 110-2) and may, upon such a determination, disable the attached infrared camera.

Although described herein the context of solar panel inspection, other structures and/or contexts are contemplated, such as cattle herd tracking (e.g., position and/or heath), mining inspection, chemical spill survey, large distribution pipe inspection, habitat survey, marine turtle breeding sites, alligator nest mapping, precision agriculture, and/or other contexts that benefit from highly accurate and/or reliable (e.g., repeatable) radiometric thermal image analysis, as described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

We claim:

1. A system comprising:
a first flight platform;
an infrared imager coupled to the first flight platform and configured to capture infrared images of a scene in view of the first flight platform and output infrared data associated with the infrared images and/or the scene;
a flight state sensor coupled to the first flight platform and configured to measure state data corresponding to a physical state of the first flight platform and/or the infrared imager;
a flight platform communications module; and a logic device configured to:
  receive the infrared data from the infrared imager and the state data from the flight state sensor, wherein the infrared data is configured to measure an aspect of at least a portion of the scene, and wherein the state data corresponds to the infrared data of the aspect of the scene, and
  communicate the infrared data and the state data, via the flight platform communications module, to an aggregation server configured to aggregate infrared data and state data from multiple flights of one or more flight platforms including at least one flight of the first flight platform, to generate image data for an image of at least a part of the scene and/or of an object in the scene based on infrared images captured in the multiple flights, wherein the infrared data from each flight comprise at least a portion of the scene and/or of the object;
wherein said aggregating of the infrared data comprises averaging or weight-averaging data obtained using the infrared imager and one or more additional infrared imagers based on a determination as to which of the infrared imagers is more likely to output accurate data.

2. The system of claim 1, further comprising:
an environmental sensor configured to measure environmental data associated with the first flight platform, the infrared imager, and/or the scene, wherein the logic device is further configured to communicate the environmental data to the aggregation server;
wherein said averaging or weight-averaging comprises averaging or weight-averaging data from at least two different flights.

3. The system of claim 2, wherein:
the environmental sensor comprises a secondary module coupled to the flight platform;
the secondary module comprises at least one of a barometric pressure sensor, a visible irradiance data sensor, a temperature sensor, a humidity sensor, a thermopile, a nephelometer, an ozone sensor, a carbon monoxide sensor, a carbon dioxide sensor, a wind strength sensor, a wind speed sensor, a wind direction sensor, a visual imaging device, an anemometer and/or a high dynamic range (HDR) imaging device; and
the logic device is further configured to:
  determine corrected infrared data based, at least in part, on the infrared data and the environmental data, wherein the infrared data communicated to the aggregation server comprises the corrected infrared data;
wherein the environmental data are different in at least two different flights, to require respective different amounts of correction.

4. The system of claim 1, further comprising:
the aggregation server, wherein the aggregation server comprises:
  a server communications module configured to receive the infrared and state data obtained in the multiple flights;
  a memory configured to store received infrared data; and
  a logic device configured to:
    receive the infrared data from the multiple flights,
    receive the state data from the multiple flights,
    construct a point model based, at least in part, on the infrared data, and
    render the point model for display to a user;
  wherein image and/or state data obtained by the aggregation server in one of the flights is used for flight planning of at least one other one of the flights.

5. The system of claim 1, wherein the flight state sensor comprises at least one of a gyroscope, accelerometer, global navigation satellite system (GNSS) receiver, timing device, compass, orientation sensor, and/or environmental sensor; and
wherein at least one of the flights is performed by a second flight platform different from the first flight platform, and said averaging or weight averaging comprises averaging or weight averaging data obtained from a plurality of flight platforms comprising the first and second flight platforms.

6. The system of claim 1, wherein the first flight platform and/or the infrared imager further comprises a location sensing device configured to receive location data from an external location data source.

7. The system of claim 6, wherein the logic device is further configured to:
  determine a location of the infrared imager, wherein the location of the infrared imager is determined based, at least in part, on the location data;
  determine that the location is a prohibited location; and
  change a characteristic of the infrared imager.

8. The system of claim 7, wherein the changing the characteristic of the infrared imager comprises preventing the infrared imager from obtaining images by electronically and/or mechanically disabling the infrared imager.

9. The system of claim 6, wherein the logic device is further configured to:
  communicate the location data to the aggregation server via the flight platform communications module;
  receive instructions from the aggregation server to change a characteristic of the infrared imager; and
  change the characteristic of the infrared imager.

10. A method comprising using the system of claim 1, wherein using the system of claim 1 comprises:
  positioning the first flight platform in view of the scene;
  capturing at least one of the infrared images of the scene;
  measuring the state data corresponding to the at least one infrared images of the scene; and
  communicating the infrared data corresponding to the captured at least one of the infrared images and the corresponding measured state data to the aggregation server;
  wherein at least two of the infrared images captured in different flights are captured at respective different altitudes.

11. A method comprising using the system of claim 1, wherein using the system of claim 1 comprises:
  receiving, at the aggregation server, the infrared data obtained in the multiple flights from one or more infrared imagers coupled to one or more flight platforms including the first flight platform;
  receiving the state data obtained in the multiple flights;
  constructing a point model based, at least in part, on the infrared data; and
  rendering the point model for display to a user.

12. The method of claim 11, further comprising:
  determining weights for at least portions of the infrared data received from the one or more infrared imagers; and
  constructing the point model according to the determined weights.

13. The method of claim 11, further comprising:
receiving environmental data obtained in the multiple flights from the one or more flight platforms; and
constructing the point model based at least on the infrared data and the environmental data.

14. The method of claim 11, further comprising:
receiving environmental data obtained in the multiple flights from the one or more flight platforms;
determining corrected infrared data based, at least in part, on the infrared data and the environmental data; and
constructing the point model based at least in part on the corrected infrared data.

15. The method of claim 11, further comprising:
determining an update requirement for the point model; and
providing instructions to at least one of the one or more flight platforms responsive to the update requirement, wherein the instructions comprise infrared imager mount angle, flight path, and/or speed instructions.

16. The method of claim 11, further comprising:
receiving environmental data from a secondary source separate from the one or more flight platforms;
determining corrected infrared data based, at least in part, on the infrared data and the environmental data; and
constructing the point model based at least on the corrected infrared data.

17. The method of claim 11, further comprising:
communicating the rendered point model to a user device for display to the user.

18. The method of claim 11, further comprising:
receiving location data from one or more location sensing devices coupled to at least
determining a location of at least one of the one or more infrared imagers from, at least, the location data;
determining that the location is a prohibited location; and
communicating instructions to change a characteristic of the at least one infrared imager.

19. A method comprising:
receiving, by an aggregation server, infrared data from a plurality of infrared imagers coupled to one or more flight platforms and state data from one or more flight state sensors coupled to the one or more flight platforms, wherein the infrared data received from each infrared imager is configured to measure an aspect of at least a portion of a scene, and wherein the state data from each infrared imager corresponds to the infrared data of the aspect of the scene, the infrared and state date being obtained by the one or more imagers in multiple flights of the one or more flight platforms; and
generating an image of at least a part of the scene from the infrared data and state data obtained in the multiple flights, wherein the image data obtained in each flight represent at least a portion of the scene;
wherein said generating an image comprises averaging or weight-averaging data obtained using at least two of the infrared imagers based on a determination as to which of the at least two of the infrared imagers is more likely to output accurate data.

20. The method of claim 19, further comprising:
determining a location of at least one infrared imager;
determining that the location is a prohibited location; and
preventing the infrared imager from obtaining images by electronically and/or mechanically disabling the infrared imager.

* * * * *

UNITED STATES PATENT AND TRADEMARK OFFICE
CERTIFICATE OF CORRECTION

PATENT NO. : 11,169,028 B2
APPLICATION NO. : 15/997302
DATED : November 9, 2021
INVENTOR(S) : Jeffrey D. Frank et al.

It is certified that error appears in the above-identified patent and that said Letters Patent is hereby corrected as shown below:

In the Claims

In Claim 18, Column 35, Line 33 change "devices coupled to at least" to -- devices coupled to at least one of the one or more flight platforms; --.

Signed and Sealed this
Third Day of May, 2022

Katherine Kelly Vidal
*Director of the United States Patent and Trademark Office*